(12) United States Patent
Kwon et al.

(10) Patent No.: US 11,202,268 B2
(45) Date of Patent: Dec. 14, 2021

(54) DISTRIBUTED ANTENNA SYSTEM AND METHOD OF OPERATION THEREOF

(71) Applicant: SOLiD, INC., Seongnam-si (KR)

(72) Inventors: Dong Hee Kwon, Yongin-si (KR); Hoo Pyo Hong, Seongnam-si (KR); Yong Hoon Kang, Seoul (KR); Dae Young Kim, Seoul (KR); Young Man Cho, Seoul (KR)

(73) Assignee: SOLiD, INC., Seongnam-si (KR)

( * ) Notice: Subject to any disclaimer, the term of this patent is extended or adjusted under 35 U.S.C. 154(b) by 153 days.

(21) Appl. No.: 16/421,973

(22) Filed: May 24, 2019

(65) Prior Publication Data

US 2019/0364527 A1 Nov. 28, 2019

(30) Foreign Application Priority Data

May 25, 2018 (KR) .................. 10-2018-0059642
Oct. 26, 2018 (KR) .................. 10-2018-0129209

(51) Int. Cl.
| | | |
|---|---|---|
| H04W 72/04 | (2009.01) | |
| H04W 56/00 | (2009.01) | |
| H04J 3/06 | (2006.01) | |
| H04L 29/06 | (2006.01) | |
| H04B 7/15 | (2006.01) | |
| H04W 88/08 | (2009.01) | |

(52) U.S. Cl.
CPC .......... *H04W 56/0005* (2013.01); *H04B 7/15* (2013.01); *H04J 3/0658* (2013.01); *H04L 69/22* (2013.01); *H04W 72/0413* (2013.01); *H04W 72/0446* (2013.01); *H04W 88/085* (2013.01)

(58) Field of Classification Search
CPC .... H04L 45/66; H04L 69/22; H04W 72/0413; H04W 72/0446; H04J 3/0658
See application file for complete search history.

(56) References Cited

U.S. PATENT DOCUMENTS

| | | | |
|---|---|---|---|
| 9,629,008 B2 | 4/2017 | Kim | |
| 2008/0080382 A1* | 4/2008 | Dahshan | H04L 45/56 |
| | | | 370/235 |
| 2012/0314797 A1* | 12/2012 | Kummetz | H04L 27/34 |
| | | | 375/295 |

(Continued)

FOREIGN PATENT DOCUMENTS

| | | |
|---|---|---|
| KR | 10-2006-0092811 A | 8/2006 |
| KR | 10-2016-0123866 A | 10/2016 |

(Continued)

OTHER PUBLICATIONS

Office Action of Korean Application No. 10-2018-0129209 dated Nov. 7, 2018.

(Continued)

*Primary Examiner* — Gary Mui
(74) *Attorney, Agent, or Firm* — Sughrue Mion, PLLC

(57) ABSTRACT

There is provided a method of processing uplink Ethernet packets of an aggregation node included in a distributed antenna system, the method includes: receiving a plurality of uplink Ethernet packets; summing the plurality of received uplink Ethernet packets; and transmitting the summed uplink Ethernet packets in an uplink direction.

18 Claims, 19 Drawing Sheets

(56) References Cited

U.S. PATENT DOCUMENTS

| | | | |
|---|---|---|---|
| 2014/0146797 A1* | 5/2014 | Zavadsky | H04L 5/0085 370/336 |
| 2014/0146906 A1* | 5/2014 | Zavadsky | H04B 7/022 375/267 |
| 2014/0162713 A1 | 6/2014 | Stapleton et al. | |
| 2015/0341089 A1* | 11/2015 | Kummetz | H04B 7/04 375/267 |
| 2016/0105333 A1* | 4/2016 | Lenglet | H04L 43/024 370/252 |
| 2017/0257151 A1* | 9/2017 | Lange | H04L 67/10 |
| 2018/0027431 A1 | 1/2018 | Cho et al. | |
| 2018/0091427 A1* | 3/2018 | Kumar | H04L 47/32 |
| 2018/0124635 A1* | 5/2018 | Ranson | H04L 12/56 |
| 2018/0212713 A1* | 7/2018 | Yu | H04L 1/0083 |
| 2019/0028178 A1 | 1/2019 | Oh | |
| 2019/0058662 A1 | 2/2019 | Hong et al. | |
| 2020/0092154 A1* | 3/2020 | Kwon | H04B 7/022 |

FOREIGN PATENT DOCUMENTS

| | | |
|---|---|---|
| KR | 10-2017-0096335 A | 8/2017 |
| KR | 10-2017-0111382 A | 10/2017 |
| KR | 10-2017-0117028 A | 10/2017 |
| WO | 2009/059836 A1 | 5/2009 |

OTHER PUBLICATIONS

Ma et al., "RADIOSTAR: Providing Wireless Coverage Over Gigabit Etherne", Bell Labs Technical Journal, 2009, vol. 14, No. 1, pp. 7-24 (total 18 pages).

Communication dated Oct. 9, 2019 from European Patent Office in EP Application No. 19176781.3.

English Translation of Communication dated Aug. 19, 2020 by the Korean Intellectual Property Office in application No. 10-2019-0082028.

Communication dated May 19, 2021 from the European Patent Office in Application No. 19176781.3.

* cited by examiner

DISTRIBUTED ANTENNA SYSTEM AND METHOD OF OPERATION THEREOF

CROSS-REFERENCE TO RELATED APPLICATION

This application claims the benefit of Korean Patent Application No. 10-2018-0059642, filed on May 25, 2018, and Korean Patent Application No. 10-2018-0129209, filed on Oct. 26, 2018, in the Korean Intellectual Property Office, the disclosures of which are incorporated herein in its entirety by reference.

BACKGROUND

1. Field

One or more embodiments relate to a distributed antenna system and a method of operating the distributed antenna system. More particularly, the disclosure is related to a distributed antenna system based on time-sensitive networking (TSN) technology.

2. Description of the Related Art

A distributed antenna system is an antenna system that is used to spatially distribute a plurality of antennas to solve high traffic capacity problems in an indoor environment or a certain area.

The distributed antenna system is installed in buildings, tunnels, subways, etc. to provide communication services even to a shadow area where base transceiver station signals are difficult to reach. The distributed antenna system is also used to provide smooth services in stadiums, large-sized facilities, and places where service demand is high.

As such, the distributed antenna system is a system for supplementing the limited output power and coverage of a base station, and is widely used to solve a service shadow area.

In recent years, as communication services have developed mainly in data communication, the distributed antenna system is being developed not only to expand a communication service area, but also to provide various services in combination.

The distributed antenna system requires accurate time synchronization since a plurality of physically separated antennas provide communication services. For this time synchronization, clock synchronization is performed by using global positioning system (GPS) signals, or time division multiplexing-based network transmission technology is used.

However, such a synchronization method may be used only in a limited environment, and there is a problem that construction cost is increased.

In addition, since a time synchronization method used in the distributed antenna system provides only a few technical elements for time synchronization, there is a limitation in not addressing new requirements such as heterogeneous interworking and big data transmission required in a next-generation network environment.

SUMMARY

The present disclosure provides a distributed antenna system using Time-Sensitive Networking (TSN) and a method of operating the distributed antenna system.

Furthermore, the present disclosure provides an uplink summation device optimized in a distributed antenna system using TSN and a method thereof.

Furthermore, the present disclosure provides a distributed antenna system capable of effectively coping with temporal and spatial traffic fluctuations.

Furthermore, the present disclosure provides a distributed antenna system synchronized with high accuracy and provides various services.

Furthermore, the present disclosure provides summing uplink packets using an Ethernet frame to efficiently utilize a bandwidth and minimize latency.

An uplink Ethernet packet described in the present disclosure may refer to an uplink transmission Ethernet packet transmitted from a terminal to a source such as a base station.

The uplink Ethernet packet may also refer to packets according to a framed radio signal stream, the packets digitized using Ethernet technology.

Also, the radio signal stream may be mapped to a flow. Thus, the above-described uplink Ethernet packets may be referred to as an uplink flow.

Therefore, the uplink Ethernet packet described in the following description may mean either an uplink radio signal stream, an uplink stream, an uplink Ethernet stream, an uplink Ethernet frame, an uplink frame, an uplink Ethernet flow, or an uplink flow.

According to an aspect of a disclosure, there is provided a method of processing uplink Ethernet packets of an aggregation node included in a distributed antenna system, the method includes: receiving a plurality of uplink Ethernet packets; summing the plurality of received uplink Ethernet packets; and transmitting the summed uplink Ethernet packets in an uplink direction.

According to an exemplary embodiment, the method may further include determining whether to sum the plurality of received uplink Ethernet packets based on at least one of a latency and a bandwidth related to a transmission of the plurality of received uplink Ethernet packets, wherein the summing of the plurality of received uplink Ethernet packets includes summing the plurality of received uplink Ethernet packets based on a result of the determining.

According to an exemplary embodiment, the determining of whether to sum the plurality of received uplink Ethernet packets may include determining whether to sum at least some of the plurality of received uplink Ethernet packets based on information about at least one of summation latency occurring according to summation of at least some of the plurality of received uplink Ethernet packets, cut through latency occurring according to the transmission of the plurality of uplink Ethernet packets, and a bandwidth change due to summation of at least some of the plurality of received uplink Ethernet packets.

According to an exemplary embodiment, the method may further include determining, in a delivery tree of multiple levels of the distributed antenna system, whether to sum the plurality of received uplink Ethernet packets by considering a level at which the aggregation node is located, wherein the summing of the plurality of received uplink Ethernet packets includes summing the plurality of received uplink Ethernet packets based on the result of the determining.

According to an exemplary embodiment, the method may further include receiving a control signal for whether to sum the plurality of received uplink Ethernet packets and a summation operation, wherein the summing of the plurality of received uplink Ethernet packets includes summing the plurality of received uplink Ethernet packets according to the received control signal.

According to an exemplary embodiment, the summing of the plurality of received uplink Ethernet packets may include: assigning weights to the plurality of uplink Ethernet packets; and summing the plurality of uplink Ethernet packets comprising the assigned weights.

According to an exemplary embodiment, the transmitting of the summed uplink Ethernet packets in an uplink direction may include: allocating a flow for the summed uplink Ethernet packets; and transmitting the summed uplink Ethernet packets to the allocated flow.

According to an exemplary embodiment, the summing of the plurality of received uplink Ethernet packets may include summing only some of the plurality of received uplink Ethernet packets, and the transmitting of the summed uplink Ethernet packets in an uplink direction may include transmitting the summed uplink Ethernet packets obtained by summing only some of the plurality of received uplink Ethernet packets and the remaining uplink Ethernet packets not summed among the plurality of received uplink Ethernet packets in an uplink direction.

According to an exemplary embodiment, the summing of the plurality of received uplink Ethernet packets may include: analyzing a header of each of the plurality of received uplink Ethernet packets; extracting a flow of each of the plurality of uplink Ethernet packets based on the analyzed header; scheduling the extracted flows; and summing the plurality of Ethernet packets based on the scheduling.

According to another aspect of the disclosure, there is provided a sub system of a distributed antenna system, the sub system includes: an uplink summation module that receives and sums a plurality of uplink Ethernet packets; and a switch that transmits the summed uplink Ethernet packets in an uplink direction.

According to an exemplary embodiment, the uplink summation module may be configured to: determine whether to sum the plurality of received uplink Ethernet packets based on at least one of a latency and a bandwidth related to a transmission of the plurality of received uplink Ethernet packets; and sum the plurality of received uplink Ethernet packets based on a result of the determining.

According to an exemplary embodiment, the uplink summation module may be configured to determine whether to sum at least some of the plurality of received uplink Ethernet packets based on information about at least one of summation latency occurring according to summation of at least some of the plurality of received uplink Ethernet packets, cut through latency occurring according to the transmission of the plurality of uplink Ethernet packets, and a bandwidth change due to summation of at least some of the plurality of received uplink Ethernet packets.

According to an exemplary embodiment, the uplink summation module may be configured to determine, in a delivery tree of multiple levels of the distributed antenna system, whether to sum the plurality of received uplink Ethernet packets considering a level at which the switch receiving the plurality of uplink Ethernet packets.

According to an exemplary embodiment, the uplink summation module may be configured to: receive a control signal for whether to sum the plurality of received uplink Ethernet packets and a summation operation, and sum the plurality of received uplink Ethernet packets according to the received control signal.

According to an exemplary embodiment, the sub system may further include a network controller, wherein the network controller is configured to: determine whether to sum the plurality of received uplink Ethernet packets of the uplink summation module based on at least one of latency and a bandwidth related to transmission of the plurality of received uplink Ethernet packets; and control the uplink summation module according to a result of the determining.

According to an exemplary embodiment, the network controller may be configured to: allocate a flow of each of the plurality of uplink Ethernet packets; and control the switch to transmit the plurality of uplink Ethernet packets to the allocated flows.

According to an exemplary embodiment, the uplink summation module may be configured to: assign weights to the plurality of uplink Ethernet packets, respectively; and sum the plurality of uplink Ethernet packets comprising the assigned weights.

According to an exemplary embodiment, the switch may be configured to: receive an allocated flow for the summed uplink Ethernet packets from a network controller; and transmit the summed uplink Ethernet packets to the allocated flow.

According to an exemplary embodiment, the uplink summation module may be configured to sum only some of the plurality of received uplink Ethernet packets, and the switch may be configured to transmit the summed uplink Ethernet packets obtained by summing only some of the plurality of received uplink Ethernet packets and the remaining uplink Ethernet packets not summed among the plurality of received uplink Ethernet packets in an uplink direction.

According to an exemplary embodiment, the uplink summation module may be configured to: analyze a header of each of the plurality of received uplink Ethernet packets; extract a flow of each of the plurality of uplink Ethernet packets based on the analyzed header; schedule the extracted flows; and sum the plurality of Ethernet packets based on the scheduling.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
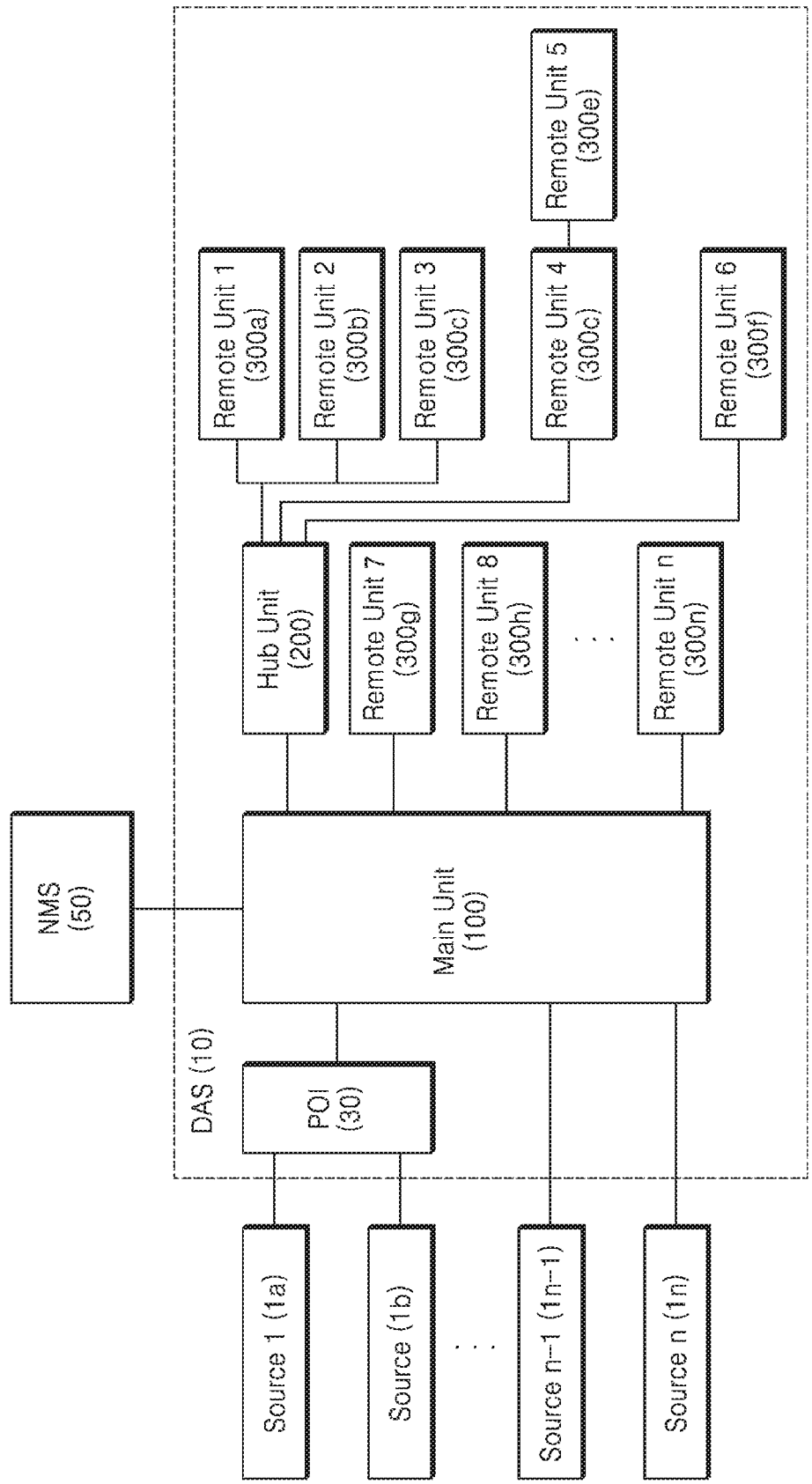
FIG. 1 is a conceptual diagram of a distributed antenna system according to an embodiment.

The disclosure may be variously modified and have various embodiments, so that specific embodiments will be illustrated in the drawings and described in the detailed description. However, this does not limit the disclosure to specific embodiments, and it should be understood that the disclosure covers all the modifications, equivalents and replacements included within the idea and technical scope of the disclosure.

In the following description, a detailed explanation of known related technologies may be omitted to avoid unnecessarily obscuring the subject matter of the present disclosure. In addition, numeral figures (e.g., first, second, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit", "er", "or", "module", and the like disclosed in the specification mean a unit that processes at least one function or operation and this may be implemented by hardware such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA), or software, or a combination of hardware and software.

Thus, the configurations described herein may be implemented by instructions executed by hardware such as a processor etc.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

An uplink Ethernet packet described in the present disclosure may refer to an uplink transmission Ethernet packet transmitted from a terminal to a source such as a base station.

The uplink Ethernet packet may also refer to packets according to a framed radio signal stream, the packets digitized using Ethernet technology.

Also, the radio signal stream may be mapped to a flow. Thus, the above-described uplink Ethernet packets may be referred to as an uplink flow.

Therefore, the uplink Ethernet packet described in the following description may mean either an uplink radio signal stream, an uplink stream, an uplink Ethernet stream, an uplink Ethernet frame, an uplink frame, an uplink Ethernet flow, or an uplink flow.

Furthermore, the above description may be applied not only to the uplink Ethernet packet but also to a downlink Ethernet packet.

Thus, the downlink Ethernet packet may refer to a downlink transmission Ethernet packet transmitted from the source such as a base station to the terminal.

The downlink Ethernet packet may also refer to packets according to a framed radio signal stream, the packets digitized using Ethernet technology.

Also, the radio signal stream may be mapped to a flow. Thus, the above-described downlink Ethernet packets may be referred to as a downlink flow.

Therefore, the downlink Ethernet packet described in the following description may mean either a downlink radio signal stream, a downlink stream, a downlink Ethernet stream, a downlink Ethernet frame, a downlink frame, a downlink Ethernet flow, or a downlink flow.

As such, the uplink Ethernet packet and the downlink Ethernet packet described in the present disclosure may be expressed in various terms as described above.

Hereinafter, embodiments of the disclosure will be described in detail in turn.

FIG. 1 is a conceptual diagram of a distributed antenna system according to an embodiment.

Referring to FIG. 1, a distributed antenna system (DAS) 10 may include a point of interface (POI) 30, a main unit 100, a hub unit 200, and a plurality of remote units 300 (e.g. first to $n^{th}$ remote units 300a to 300n). The POI 30 and the main unit 100 may be referred to as a head end. Alternatively, the main unit 100 may be referred to as the head end. The hub unit 200 may be referred to as a hub or an expansion node. The remote units 300 may be referred to as remote nodes.

The POI 30 may be connected to a plurality of sources 1a and 1b. In an exemplary embodiment, each of the plurality of sources 1a and 1b is a radio frequency (RF) signal source such as a service provider's base station. The POI 30 may receive base station signals corresponding to a downlink from the plurality of sources 1a and 1b. The POI 30 may process the base station signals and transmit the processed base station signals to the main unit 100. The number of sources may vary.

The POI 30 may process the base station signals received from the sources 1a and 1b, wherein the base station signals are to be processed by the distributed antenna system 10. The POI 30 may transmit terminal signals corresponding to an uplink that has been processed by the distributed antenna system 10 to the sources 1a and 1b.

For example, the POI 30 may attenuate the base station signals of high power level and convert the base station signals to a suitable level for the distributed antenna system 10 and may separate the base station signals transmitted from the sources 1a and 1b into a downlink and an uplink. In addition, the POI 30 may attenuate the terminal signals processed in the distributed antenna system 10 so as to be suitable for the sources 1a and 1b.

The POI 30 may also be referred to as a signal matching device.

In an exemplary embodiment, the POI 30 may not be included in the distributed antenna system 10 according to the use of time-sensitive networking (TSN) or an Ethernet method, which will be described later below.

Accordingly, some sources 1n-1 and 1n may be directly connected to the main unit 100 without going through the POI 30. The sources 1n-1 and 1n that do not go through the POI 30 may be signal sources such as a service provider's base station using digital signals of various formats.

For example, the sources 1n-1 and 1n may be sources using data packets formatted according to standardized telecommunication protocol. In an embodiment, the sources 1n-1 and 1n may be sources using at least one of a common public radio interface (CPRI), an Ethernet-based common public radio interface (eCRPI), an open radio equipment interface (ORI), and open base station architecture initiative (OBSAI) protocol.

The main unit 100 may be connected to the POI 30, the hub unit 200, and a plurality of remote units 300 through a communication medium. The communication medium may include an optical fiber, a coaxial cable, an Ethernet cable, or the like.

The main unit 100 may transmit a received base station signal to the hub unit 200 and the remote unit 300.

For example, the main unit 100 may convert a radio frequency (RF) signal into a digital signal and may distribute the converted digital signal to the hub unit 200 and the remote unit 300.

In more detail, the main unit 100 may distribute the converted digital signal such that the received RF signal or the data packet is transmitted to the remote unit 300 corresponding to an area to be output.

The digital signal may include an Ethernet frame-based signal.

The main unit 100 may be connected to another main unit (not shown) and may transmit or receive a base station signal or a terminal signal to or from the connected main unit. The base station signal may refer to a downlink signal, and the terminal signal may refer to an uplink signal. The connected main unit may be an extended main unit. In an exemplary embodiment, the main unit 100 may be connected to other main units through the extended main unit.

The main unit 100 may allocate or reallocate the capacity for communication service. The capacity may mean service capacity.

The main unit 100 may allocate or reallocate the capacity for each service channel. The main unit 100 may also allocate or reallocate the capacity for each sector, cell, etc.

In addition, the main unit 100 may support both a frequency division duplex scheme and a time division duplex scheme. For example, the main unit 100 may receive a frequency division duplex (FDD) carrier, and may also receive a time division duplex (TDD) carrier. The carrier may include data according to a service signal and may also be a service signal.

The main unit 100 may also be referred to as a distribution & aggregation unit (DAU). The main unit 100 may also be referred to as a head-end unit.

The main unit 100 may include a TSN switch (not shown) to be described later below referring FIG. 2. Alternatively, the main unit 100 may be connected to the TSN switch corresponding to the main unit 100 to be operated.

The hub unit 200 may be connected to the main unit 100 and the remote unit 300. For example, the hub unit 200 may be connected to the main unit 100 and a plurality of remote units 300 via a communication medium. The hub unit 200 may be connected to the main unit 100 and the plurality of remote units 300 through an Ethernet cable. The communication medium may include an optical fiber, a coaxial cable, an UTP cable, or the like.

The hub unit 200 may be connected between the main unit 100 and the remote unit 300 to expand connection capacity between the main unit 100 and the remote unit 300. For example, the hub unit 200 may be connected to the main unit 100 and may be connected to the first to sixth remote units 300a to 300f in various topology forms. For example, the hub unit 200 may be connected to the first to third remote units 300a to 300c in a star topology, and may be connected to the fourth and fifth remote units 300d to 300e in a cascade topology. Therefore, the main unit 100 may be directly connected to seventh to $n^{th}$ remote units 300g to 300n and may be connected to the first to sixth remote units 300a to 300f through the hub unit 200. The hub unit 200 may be connected to a remote unit in various topology forms in addition to the exemplary structure described above. For example, the hub unit 200 may be connected to a plurality of remote units in the form of a star, a bus, a ring, a mesh, a tree, or the like.

In another embodiment, the distributed antenna system 10 may be configured with a topology in which the remote unit 300 is connected to the main unit 100 through the hub unit 200.

The hub unit 200 may transmit signals between the connected main unit 100 and the remote unit 300. In addition, the hub unit 200 may convert the format of a transmitted signal during the signal transmission process.

For example, the hub unit 200 may convert a digital signal transmitted from the main unit 100 into an Ethernet format and may transmit data converted into the Ethernet format to the remote unit 300. The hub unit 200 may convert a signal in the Ethernet format transmitted from the remote unit 300 into a digital signal and may transmit the digital signal to the main unit 100.

The hub unit 200 may supply power to the remote unit 300. For example, the hub unit 200 may supply power to the connected remote unit 300 through power of Ethernet (PoE).

The hub unit 200 may monitor current for each of the plurality of connected remote units 300 and may automatically shut off the power according to the monitoring.

The hub unit 200 may include the TSN switch (not shown) to be described later below referring FIG. 2. and the hub unit 200 may be the TSN switch.

Therefore, the TSN switch to be described later below may perform the operation or function of the hub unit 200 described above.

In addition, the hub unit 200 may include a plurality of TSN switches arranged in a hierarchy. Accordingly, the plurality of TSN switches may perform the function of the hub unit 200.

The remote unit 300 may be connected to the main unit 100 directly or through the hub unit 200.

The remote unit 300 may output a signal transmitted from the main unit 100 through an antenna and may transmit a terminal signal received through the antenna to the main unit 100.

The remote unit 300 may be divided into a high power remote unit and a low power remote unit according to a level of an output power.

The low power remote unit may be referred to as a low power radio node, and the high power remote unit may be referred to as a high power radio node.

The remote unit 300 may include an integrated antenna and may be connected to an external antenna through an external antenna port.

In addition, the remote unit 300 may include or be connected to a plurality of directional antennas such that the remote unit 300 may transmit signals to a specific area or a specific sector, and may receive signals from the specific area or the specific sector.

For example, the remote unit 300 may include at least one sector antenna or may be connected to the sector antenna.

In addition, the remote unit 300 may include or be connected to an omnidirectional antenna or a directional antenna.

The remote unit 300 may selectively operate only some of the integrated antenna and the external antenna.

The remote unit 300 may function as an extended remote unit 300 that extends connection between another remote unit and the main unit 100 or the hub unit 200. Accordingly, the other remote unit may be connected to the main unit 100 or the hub unit 200 through the extended remote unit 300.

A plurality of remote units connected to each other through the extended remote unit 300 may be configured in various topologies. For example, the plurality of remote units connected to each other through the extended remote unit 300 may be configured in various forms such as a star, a bus, a ring, a mesh, a tree, and the like.

A network management system (NMS) 50 may manage a network including the distributed antenna system 10.

For example, the NMS 50 may monitor and control configurations included in the distributed antenna system 10, such as the state and operation of one node.

The NMS 50 may include at least one of a centralized network configuration module (not shown), a centralized user configuration module (not shown), and a TSN controller (not shown), which will be described later below referring FIGS. 3 and 4.

The above description of the distributed antenna system 10 is merely an example for explanation, and may vary according to a designer's or user's selection. For example, the distributed antenna system 10 may be implemented in an analog processing configuration other than the digital processing configuration described above, or may be implemented by mixing the digital processing configuration and the analog processing configuration.

Furthermore, the distributed antenna system 10 may include configurations which will be described later below.

The distributed antenna system 10 according to various embodiments of the present invention may perform time-based synchronization of configurations in the distributed antenna system 10 by using TSN.

TSN refers to an upgraded function of standard Ethernet, in particular the IEEE 802.1 standard.

TSN may provide a method of time synchronization of devices using packet transmission in Ethernet, coordinated time usage capability for periodic packet transmission scheduling, and a standard parameter set for the configuration of all network elements.

Accordingly, the distributed antenna system 10 of the present disclosure may operate based on TSN Ethernet and may use time synchronization elements of the TSN. TSN synchronization may be provided through the IEEE 802.1AS standard.

IEEE 802.1AS is an IEEE 1588 profile that provides a common time concept across all nodes within an IEEE 802.1AS subnet.

Synchronization of multiple devices uses packet-based communication and may be synchronized over long distances without the effect of signal forward delay. Input/output (I/O) synchronization is less than 1 μs in devices using the IEEE 1588 profile, but may be significantly reduced from tens to hundreds of nanoseconds, depending on the system configuration.

Since the IEEE 802.1AS profile compensates for cable lengths between devices, the IEEE 802.1AS profile may focus on advantages and disadvantages of each topology for a specific application, or create hybrid topology that best fits the application's purpose.

Here, the hybrid topology may be a form of configuring the entire network by combining two or more topologies. Accordingly, the distributed antenna system 10 according to various embodiments may be configured as a network in which two or more topologies are combined.

Accordingly, the distributed antenna system 10 according to various embodiments may operate on a TSN basis and utilize the advantages described above.

A distributed antenna system including a TSN switch will be described with reference to FIG. 2.

Figure 2:
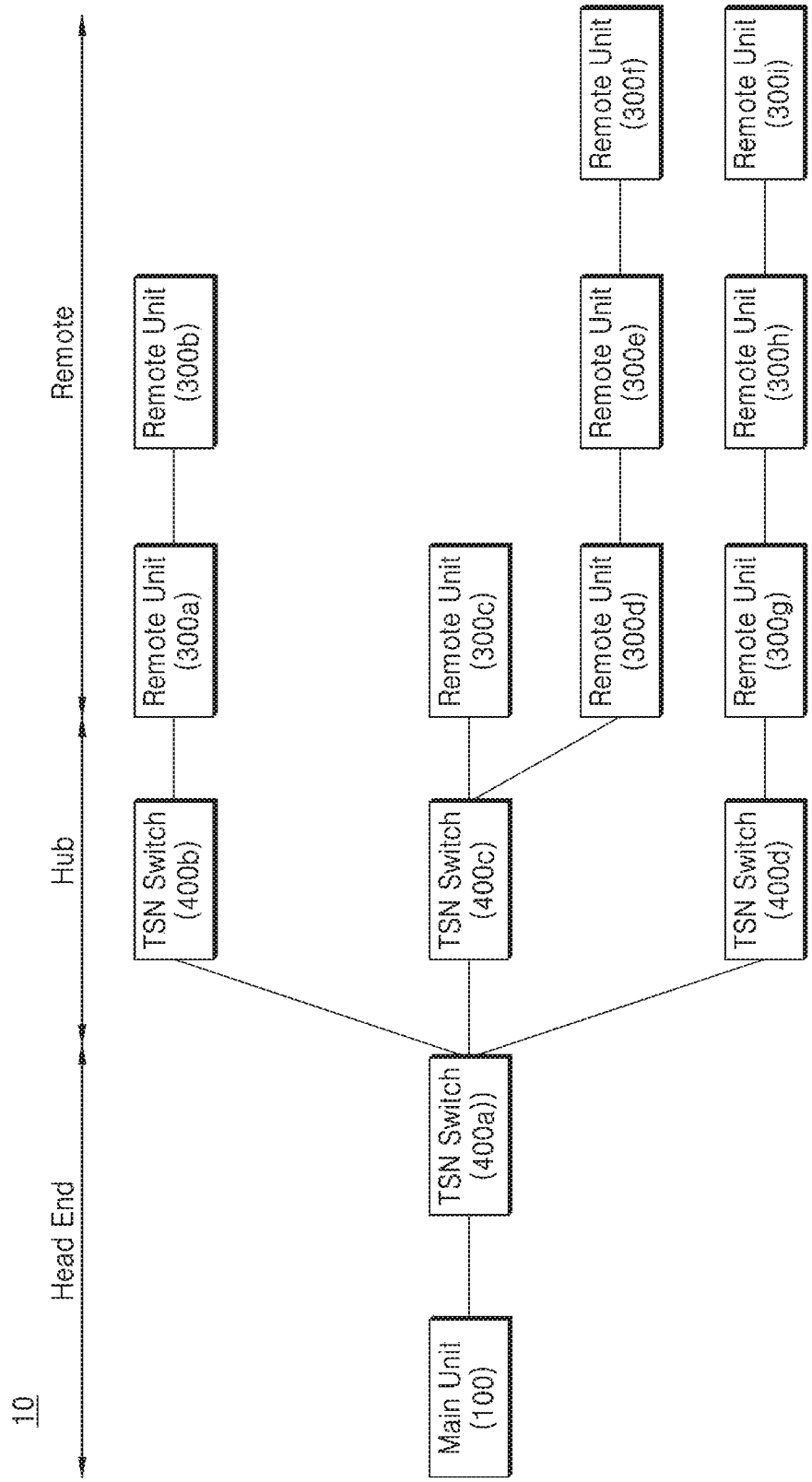
FIG. 2 is an exemplary view of a distributed antenna system including a Time-Sensitive Networking (TSN) switch according to various embodiments.

FIG. 2 is an exemplary view of the distributed antenna system including the TSN switch according to various embodiments.

Referring to FIG. 2, a head end and a hub of the distributed antenna system 10 may include the TSN switch.

For example, the main unit 100 and a first TSN switch 400a may constitute the head end. A second TSN switch 400b, a third TSN switch 400c, and a fourth TSN switch 400d may constitute the hub.

The second TSN switch 400b, the third TSN switch 400c, and the fourth TSN switch 400d constituting the hub may be connected to the remote units 300a to 300i.

The TSN switches 400a to 400d may operate on a TSN basis. Accordingly, the TSN switches 400a to 400d may perform an operation for time synchronization using the TSN.

In addition to the first TSN switch 400a of the head end and the second to fourth TSN switches 400b to 400d of the hub, the configurations included in the distributed antenna system 10, the main unit 100, the remote units 300a to 300i, and the like may all implement a TSN function, or may support only a portion of the TSN function. For example, the main unit 100, the remote units 300a to 300i, and the like may implement the above-described TSN function, or may implement a portion of the TSN function such as time synchronization, packet preemption, or a time-aware shaper (TAS) function.

In other words, the main unit 100 and the remote units 300a to 300i may be TSN equipment. Accordingly, for convenience of description, only implementation and performance of the TSN function of the TSN switches 400a to 400d will be described below.

The TSN switches 400a to 400d may not only synchronize time using the TSN but also switch a packet to be transmitted. Accordingly, the TSN switches 400a to 400d may switch uplink packets and downlink packets. An uplink packet and a downlink packet may refer to an uplink Ethernet packet, a downlink Ethernet packet, and the same applies hereinafter.

For example, the TSN switches 400a to 400d may switch the downlink packet to be transmitted to a node to which the downlink packet will reach, e.g., a remote unit.

The TSN switches 400a to 400d may switch the uplink packet to be transmitted to a node to which the uplink packet will reach, e.g., a main unit, and may sum uplink packets during the transmission.

Figure 3:
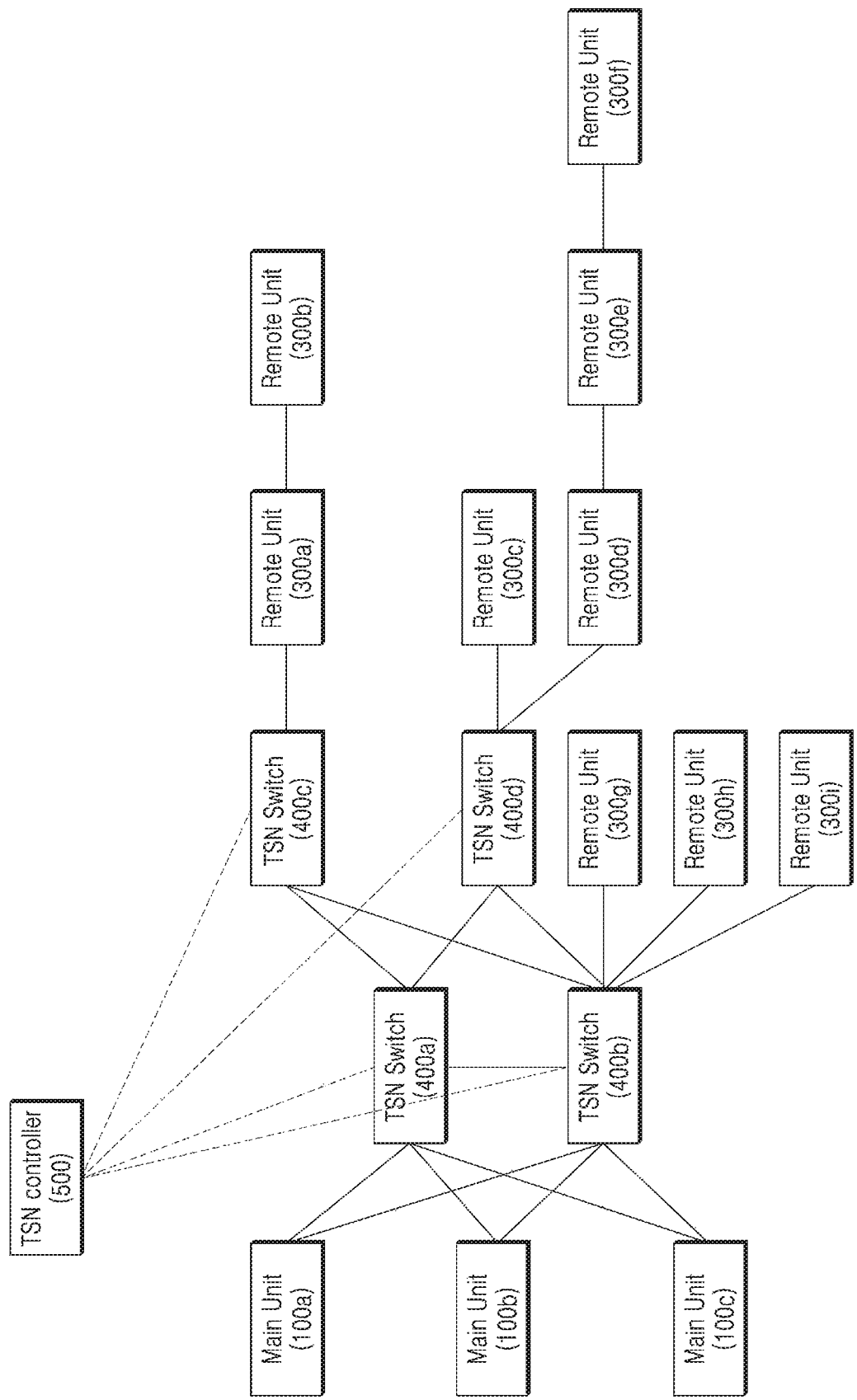
FIG. 3 is an exemplary view of configuration of a distributed antenna system including a TSN switch according to various embodiments.

Furthermore, the TSN switches 400a to 400d may receive control information about the operation of each TSN switch from the TSN controller 500 (refer to FIG. 3). Also, the TSN switches 400a to 400d may operate based on the received control information.

For example, the TSN switches 400a to 400d may receive control information about the flow of each of uplink packet/downlink packet and the summation of uplink packets and downlink packets and the like from the TSN controller 500, and may operate based on the received control information.

The TSN controller 500 (not shown in FIG. 2) may have overall information about the inside of a network and may have a global view. The TSN controller 500 may control configurations inside the network based on the overall information about the inside of the network and the global view. The inside of the network may refer to the inside of the network constituting the distributed antenna system 10.

In more detail, the TSN controller 500 may obtain the overall information about the inside of the network such as a configuration of nodes in the network, a connection configuration between the nodes, a logical connection configuration, a status of each node, and a status of each flow. The TSN controller 500 may control not only the TSN switches but also configurations related to the TSN function in the distributed antenna system 10 based on the above-described overall information about the inside of the network.

The above-described TSN switch 400 may be a software defined networking (SDN) switch or may include an SDN function. The TSN controller 500 may be an SDN controller or may include the SDN controller. Thus, the TSN controller 500 may perform the SDN function and perform a corresponding control operation.

The remote units 300a to 300i may be connected to the TSN switches 400a to 400d to perform a distributed antenna service. Accordingly, the remote units 300a to 300i may transmit a downlink signal or a downlink packet through an antenna, and may receive a signal from a terminal (not shown) within coverage and transmit the signal as an uplink signal.

Further, the remote units 300a to 300i may be configured in a hierarchy. For example, a first remote unit 300a connected to the second TSN switch 400b may be connected to a second remote unit 300b. Accordingly, the first remote unit 300a of an upper layer may transmit a downlink signal or a downlink packet to the second remote unit 300b of a lower layer, and may transmit an uplink signal or an uplink packet received from the second remote unit 300b of the lower layer to the second TSN switch 400b. Connection and configuration between remote units may be extended through such a hierarchy.

The TSN second switch 400b of the above-described hierarchy may be included in or connected to the first remote unit 300a. Thus, the first remote unit 300a may also perform functions or operations related to the second TSN switch 400b.

The above-described hierarchy needs to be interpreted as a logical hierarchy for explaining the present disclosure. Accordingly, there may be no hierarchy in a physical configuration of the distributed antenna system 10 according to various embodiments. For example, the second TSN switch 400b may be connected to a seventh remote unit 300g, an eighth remote unit 300h, and a ninth remote unit 300i.

Although not described above, the main unit 100 may be directly connected to at least one remote unit. For example, the first TSN switch 400a connected to or included in the main unit 100 may be connected to the remote unit.

The above-described distributed antenna system 10 may be configured in various types.

For example, the distributed antenna system 10 may include various network types such as a star, a bus, a ring, a mesh, a tree, a star, and the like. The distributed antenna system 10 may be configured in a complex type including a plurality of network types.

FIG. 3 is an exemplary view of a configuration of a distributed antenna system including a TSN switch according to various embodiments.

Referring to FIG. 3, each of the TSN switches 400a to 400d configured between main units 100a to 100c and the remote units 300a to 300f may be configured in a hierarchy and may be connected between other respective TSN switches 400a to 400d.

Each of the main units 100a to 100c may be connected to the first TSN switch 400a and the second TSN switch 400b, which are TSN switches located in an upper layer, respectively. Further, each of the main units 100a to 100c may be directly connected to another main unit.

The TSN switches 400a and 400b of the upper layer may be connected to the TSN switches 400c and 400d of the lower layer, respectively.

Each of the third TSN switch 400c and the fourth TSN switch 400d which are TSN switches of the lower layer may be connected to the remote units 300a, 300c, and 300d and may communicate with other remote units 300b, 300e, and 300f connected in a hierarchy.

The TSN controller 500 may collect information related to operations of the TSN switches 400a to 400d and may transmit control information about the operations.

The information related to the operations of the TSN switches 400a to 400d herein may refer to information related to an Ethernet packet passing through the respective TSN switches 400a to 400d, such as flow, delay, traffic, and the like, and may include information related to status of each of the TSN switches 400a to 400d.

In addition, the information related to the operations of the TSN switches 400a to 400d may include information related to a communication state, a network state, and the like in the distributed antenna system 10.

The TSN controller 500 may collect the above information using telemetry.

In more detail, the TSN controller 500 may collect the information related to a communication state, a network state, and the like in the distributed antenna system 10 by using flow unit information collection (e.g., NetFlow), traffic sampling (e.g., sFlow), a counter-based network monitoring method (e.g., simple network management protocol), or the like.

Also, the TSN controller 500 may collect network telemetry in an in-band method. The in-band method refers to a method of inserting telemetry data into existing data traffic and collecting the telemetry data without generating a separate detection packet. In the in-band method, a code for tracking a moving path may be added to all generated data packets, and a path through which the packets have moved may be confirmed through a corresponding code.

This in-band network telemetry is a network monitoring framework that utilizes a P4 programming language and may collect a network state on a data plane without involvement of a control plane. For example, the TSN controller 500 may collect a switch ID, inlet port-related information (e.g., a port ID or a time stamp), outlet port-related information (e.g., a port ID, a time stamp, hop delay, link utilization, etc.), and buffer-related information (e.g., queue usage or queue congestion status) as collectable network state information.

Accordingly, the TSN controller 500 according to various embodiments may collect network telemetry not only in an existing network monitoring method but also in the in-band method, thereby collecting detailed network information in units of packets in real time. Accordingly, the present disclosure may improve network visibility using the above-described in-band network telemetry.

In addition, the control information for the above-described operations may include switching information for transmitting uplink packet/downlink packet and uplink packet summation information. The switching information for transmitting the uplink packet/downlink packet may include information about a delivery path of the uplink packet/downlink packet.

The TSN controller 500 may also serve as an SDN controller. For example, the TSN controller 500 may determine a flow, which is a packet delivery path, and may transmit information about the determined delivery path to the TSN switches 400a to 400d. The TSN controller 500 may also determine a delivery path of each of the uplink packet/downlink packet and uplink packet summation based on a network state and topology information in the distributed antenna system 10 and may transmit a result of the determination to the TSN switches 400a to 400d. Thus, the TSN controller 500 may control an operation of the TSN switches 400a to 400d or an uplink summation module 600 to be described later below.

At least one of the TSN switches 400a to 400d in the distributed antenna system 10 may include an uplink summation module for summing uplink packets. The main unit 100 or the remote unit 300 in the distributed antenna system 10 may also include the uplink summation module. The uplink summation module will be described later below.

Meanwhile, the TSN controller 500 may communicate not only with the TSN switches 400a to 400d but also with other components in the distributed antenna system 10, may exchange information related to control, and may further exchange control signals.

For example, the TSN controller 500 may communicate with at least one of the main unit 100 and the remote units 300a to 300i, may exchange information related to control, and may further exchange control signals.

Furthermore, the TSN controller 500 may communicate with the above-described NMS 50 and may exchange information related to control from the NMS 50. As described above, the TSN controller 500 may be included in the NMS 50.

A control interface of the distributed antenna system 10 according to various embodiments will be described.

Figure 4:
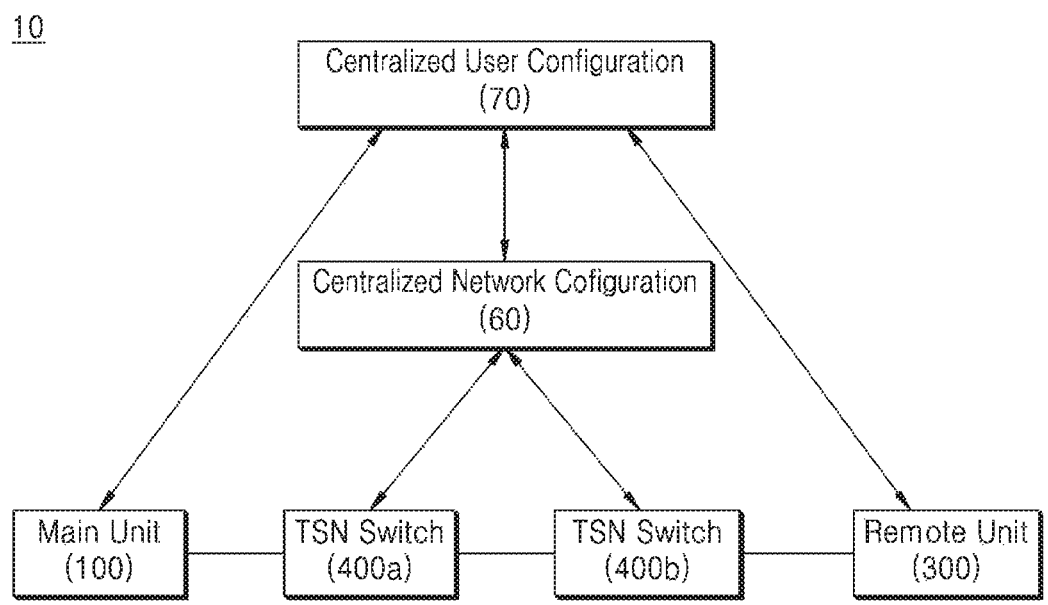
FIG. 4 is an exemplary view of a distributed antenna system including a configuration of a control interface according to various embodiments.

FIG. 4 is an exemplary view of a distributed antenna system including a configuration of a control interface according to various embodiments.

Referring to FIG. 4, the distributed antenna system 10 may include a centralized user configuration module 70 and a centralized network configuration module 60.

The centralized network configuration module 60 may receive communication requirements from the centralized user configuration module 70 and may perform network configuration.

For example, the centralized network configuration module 60 may perform scheduling of a delivery path and TSN flows.

The centralized network configuration module 60 may perform network management based on the above-described telemetry. In more detail, the centralized network configuration module 60 may receive real-time information about a current state (e.g., required output compared to required input, throughput, etc.) and input/output of each of the main unit 100 tracked by the NMS 50, a TSN controller 500, the remote unit 300, and the TSN switches 400a and 400b, a moving path for all Ethernet frames/data packets from the entire network viewpoint, end-to-end performance (e.g., throughput, delay, and jitter) including a processing time at each node, and the like, and may perform the above-described network configuration and the scheduling of the delivery path and the flows based on the received real-time information.

In addition, the centralized network configuration module 60 may perform configuration of the TSN switches 400a and 400b.

The centralized network configuration module 60 may aggregate requests received from the centralized user configuration module 70.

The centralized network configuration module 60, for each of the received communication requirements, may transmit at least one of a delivery path (routing), end-to-end transmission scheduling for each TSN flow, and calculated scheduling results to each TSN switches 400a and 400b.

The centralized network configuration module 60 may calculate a schedule after receiving a request for all flows from a user and the centralized user configuration module 70.

The centralized network configuration module 60 may be an application running on customer premises.

The centralized network configuration module 60 may include a scheduler. The scheduler may be referred to as a TSN scheduler. The scheduler may perform the above-described schedule calculation. The scheduler may be included in the above-described TSN controller 500.

The centralized user configuration module 70 may define a sender and a receiver on a topology tree/map, based on physical topology, and may receive the correlation between flow specification and a flow.

For example, the centralized user configuration module 70 may define the main unit 100 and the remote unit 300 on the topology tree/map, based on the physical topology, and may receive a bandwidth, latency, jitter, a frame size included in the flow specification and a correlation between flows.

Meanwhile, as described above, the schedule calculated by the centralized network configuration module 60 may be confirmed by a user, and the calculated schedule may be distributed after the confirmation.

A configuration confirmed herein may be an ID of each TSN flow, start and end of transmission windows at each hop, start and end of receive window at each hop, or computed end-to-end delay. The ID of each TSN flow may include a destination MAC (DMAC), a virtual LAN (VLAN), and a class of service (CoS).

The centralized user configuration module 70 and the centralized network configuration module 60, as described above, may provide a fully centralized configuration or a partially centralized configuration.

As such, the distributed antenna system 10 according to various embodiments may provide a control interface for the distributed antenna system 10. The distributed antenna system 10 may calculate a schedule after receiving a request for all flows based on information defined on the topology tree/map and a correlation between a flow specification and a flow through the centralized user configuration module 70 and the centralized network configuration module 60 described above, and may distribute the calculated schedule after confirmation.

Furthermore, the distributed antenna system 10 may also perform trouble shooting for the distributed schedule through the centralized user configuration module 70 and the centralized network configuration module 60.

Hereinafter, the configuration of the main unit 100, the remote unit 300, and the TSN switch 400 will be described in detail.

Figure 5:
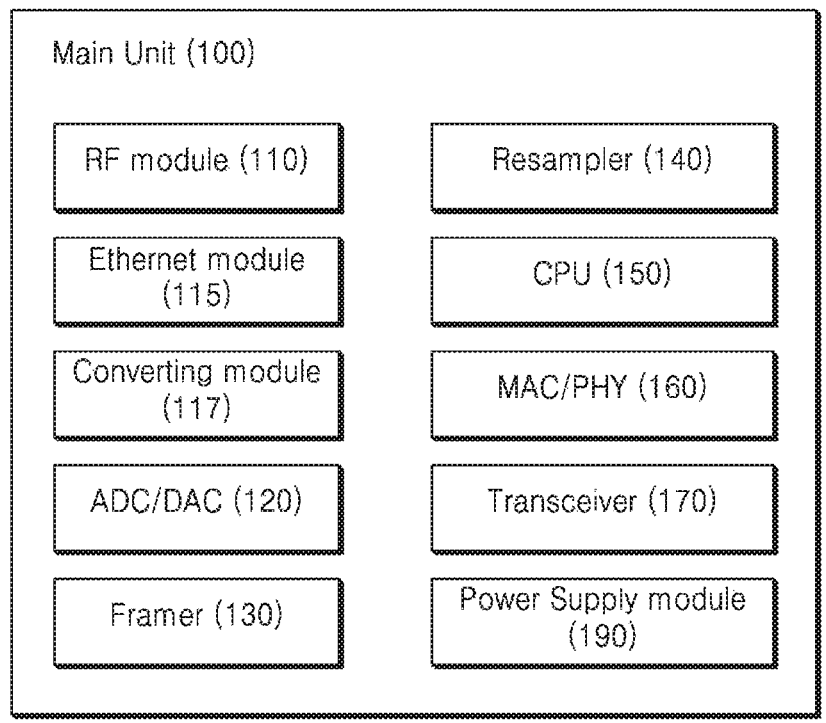
FIG. 5 is a block diagram of a configuration of a main unit according to various embodiments.

FIG. 5 is a block diagram of a configuration of a main unit according to various embodiments.

Referring to FIG. 5, the main unit 100 may include an RF module 110, an Ethernet module 115, a converting module 117, an analog-to-digital converter (ADC)/digital-to-analog converter (DAC) 120, a framer 130, a resampler 140, a CPU 150, a media access control (MAC)/physical layer (PHY) 160, a transceiver 170, and a power supply module 190.

The RF module 110 may include a plurality of RF modules.

In an embodiment, the plurality of RF modules may receive and transmit RF signals of respective bands.

In another embodiment, each of the plurality of RF modules may be connected to a different base station to receive a downlink signal and transmit an uplink signal.

The RF module 110 may attenuate the downlink signal and convert the downlink signal to a digital signal. For example, the RF module 110 may attenuate an RF signal, which is a downlink signal, and may convert the RF signal into a digital signal.

The RF module 110 may convert an uplink signal into the RF signal and amplify the RF signal. For example, the RF module 110 may convert a digital signal, which is an uplink signal, into an RF signal and may amplify the RF signal.

The RF module 110 may include the Ethernet module 115 to be described later below.

The Ethernet module 115 may include a digital signal interface and may receive a digital signal such as an Ethernet packet. The Ethernet module 115 may transmit the Ethernet packet.

In more detail, the Ethernet module 115 may interface and receive a digital signal of the same standard as a CPRI or OBSAI.

For example, the Ethernet module 115 may interface a digitized radio signal transmitted to Ethernet based a common public radio interface (eCPRI) or Ethernet defined in IEEE 1914. Also, the Ethernet module 115 may directly receive a digital signal transmitted to the CRPI or OBSAI and convert the digital signal to the eCPRI. The conversion will be described with respect to the converting module 117.

In addition, the Ethernet module 115 may receive and transmit various Ethernet signals.

The Ethernet module 115 may interface with a centralized radio access network (C-RAN), a radio access exchange (RAX), an integrated BTS (all-in-one BTS), or the like to transmit and receive digital signals.

The converting module 117 may convert a received digital signal of a specified standard. For example, the converting module 117 may receive a digital signal of the same standard as the CPRI or OBSAI and convert the digital signal to an eCPRI standard.

Also, the converting module 117 may convert the eCPRI standard into a CPRI or OBSAI standard by inverse conversion.

The converting module 117 may be included in the Ethernet module 115.

Furthermore, the Ethernet module 115 may transmit a digital signal in an uplink direction to a source 1.

The ADC/DAC 120 may perform conversion between analog and digital signals. For example, the ADC/DAC 120 may convert an analog signal to a digital signal and a digital signal to an analog signal.

The framer 130 may perform Ethernet framing.

For example, the framer 130 may frame a digital signal, a CPRI signal, an eCPRI signal, an OBSAI signal, etc. transmitted in a downlink direction into a distributed antenna system (DAS) frame.

Here, the DAS frame may refer to a digital frame used in the distributed antenna system 10. The DAS frame may be a dedicated frame used only in the distributed antenna system 10, or a frame according to various standards.

Furthermore, the framer 130 may also deframe an Ethernet frame. For example, the framer 130 may deframe the DAS frame transmitted in an uplink direction.

The framer 130 will be described in detail with reference to FIG. 6.

Figure 6:
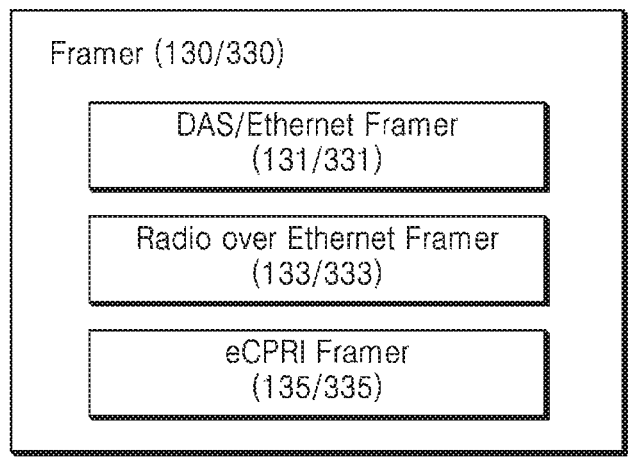
FIG. 6 is a block diagram of a configuration of a framer according to various embodiments.

FIG. 6 is a block diagram of a configuration of a framer according to various embodiments.

Referring to FIG. 6, a framer 130/330 may include at least one of a DAS/Ethernet framer 131/331, a radio over Ethernet (RoE) framer 133/333, and an eCPRI framer 135/335.

Accordingly, the framers 130/330 may perform framing/deframing with various types of Ethernet frames.

For example, the framer 130/330 may frame a received packet in a downlink direction into a DAS frame or may deframe received various types of frames in an uplink direction. Thus, the framers 130/330 may perform framing/deframing of the various types of frames into frames for a distributed antenna system in addition to the above-described types.

The above-described framers 130/330 may be included in the remote unit 300 as well as the main unit 100.

Referring again to FIG. 5, a resampler 140 may resample a received digital signal. For example, when a digital signal received by the Ethernet module 115 requires resampling, the resampler 140 may resample the digital signal and transmit the resampled digital signal to the framer 130. For example, the resampler 140 may resample a digital signal of an eCPRI standard and transmit the digital signal to the framer 130.

The resampler 140 may also resample the digital signal received from the framer 130 in a direction opposite to that described above.

The CPU 150 may process various operations related to the operation of the main unit 100.

In addition, the CPU 150 may execute instructions related to a function of the main unit 100.

The MAC/PHY 160 may include a MAC and a PHY.

The MAC/PHY 160 may encode received data or decode the encoded data. The MAC/PHY 160 may convert signals or data to conform to a transmission method.

The transceiver 170 may transmit and receive an Ethernet packet. For example, the MAC/PHY 160 may exchange an Ethernet packet with at least one of the hub unit 200, the remote unit 300, and the TSN switch 400, to which the main unit 100 is connected, through the transceiver 170.

The transceiver 170 may interface the RF module 110 or the Ethernet module 115 with at least one of the hub unit 200, the remote unit 300, and the TSN switch 400.

Furthermore, the transceiver 170 may support extension for interfacing with another main unit. Thus, the main unit 100 may be connected to another main unit through the transceiver 170.

The main unit 100 may aggregate a packet received from the RF module 110 or the Ethernet module 115 under the control of the TSN controller 500 and may distribute the packet to at least one of the hub unit 200, the remote unit 300, and the TSN switch 400. For example, the transceiver 170 may be connected to at least one of the hub unit 200, the remote unit 300, and the TSN switch 400 via at least one of an optic port and an Ethernet port. The main unit 100 may distribute the aggregated packets to at least one of the connected hub unit 200, the remote unit 300, and the TSN switch 400 under the control of the TSN controller 500.

The main unit 100 may also perform noise rejection filtering and rate conversion. For example, a DSP included in the main unit 100 may perform rate conversion and a filter (not shown) included in the main unit 100 may perform noise rejection filtering.

The main unit 100 may perform band allocation according to signal transmission or may perform sectorization under the control of the TSN controller 500. In addition, the main unit 100 may operate to perform single input single output (SISO)/multiple input multiple output (MIMO) signal routing under the control of the TSN controller 500.

Furthermore, not only the main unit 100 but also the TSN switch 400 and the remote unit 300 may perform operations for the above-described band allocation, sectorization, and SISO/MIMO signal routing under the control of the TSN controller 500.

In more detail, the TSN controller 500 may instruct the main unit 100, the remote unit 300, the TSN switch 400, and the like to perform flow change, flow tag change, or the like for flow division, flow distribution, or the like, and thus, may control the configurations in the distributed antenna system 10 to perform the above-described band allocation, sectorization, and SISO/MIMO signal routing.

The power supply module 190 may convert input and output power. For example, the power supply module 190 may convert the input and output power from alternating current (AC) to direct current (DC) or from DC to AC.

A configuration according to the operation of the main unit 100 will be described with reference to FIG. 7.

Figure 7:
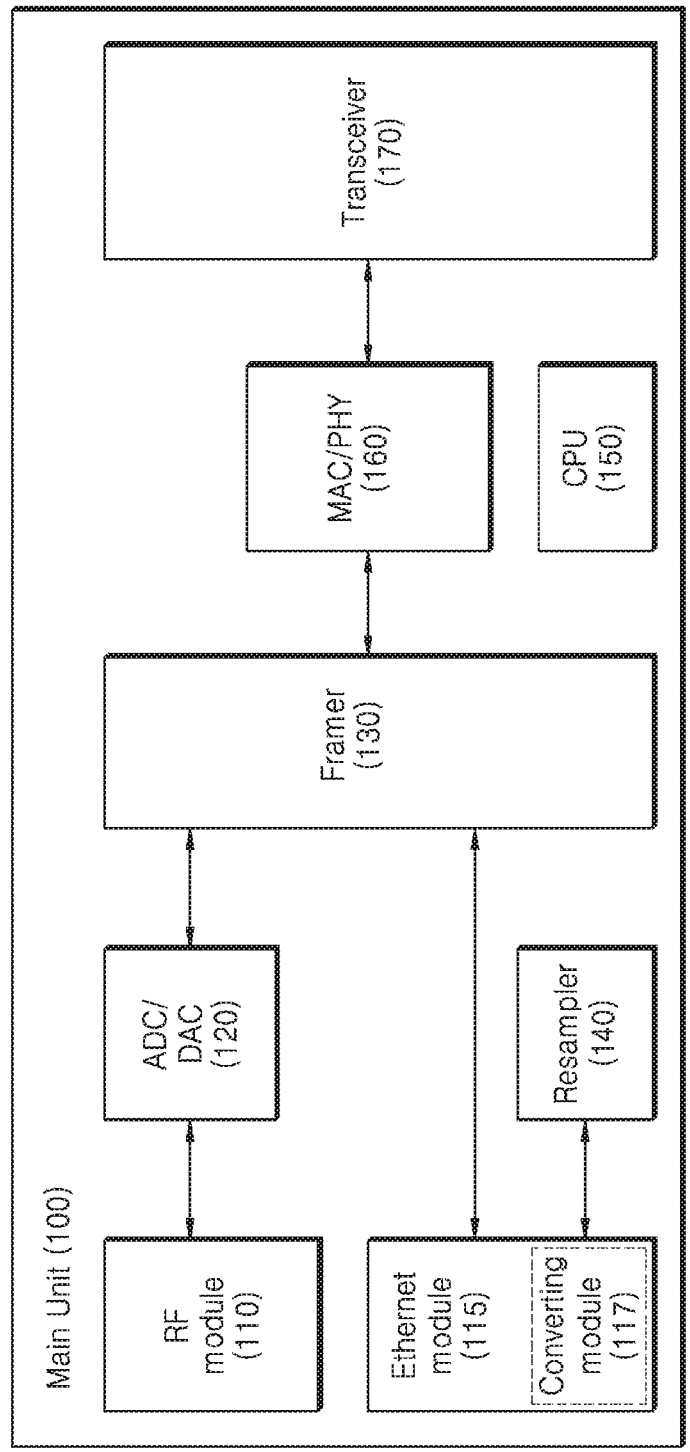
FIG. 7 is a conceptual diagram of a main unit according to various embodiments.

FIG. 7 is a conceptual diagram of the main unit 100 according to various embodiments.

Referring to FIG. 7, when the main unit 100 receives a downlink signal through the RF module 110, the main unit 100 may frame the downlink signal at the framer 130 via the ADC/DAC 120. A framed Ethernet packet, for example, a DAS frame, may be transmitted to at least one of the hub unit 200, the remote unit 300, and the TSN switch 400 through the transceiver 170 via the MAC/PHY 160.

When the main unit 100 receives a digital signal through the Ethernet module 117, the main unit 100 may transmit the digital signal to the framer 130 to frame the received digital signal. For example, when the main unit 100 receives a digital signal of an eCPRI standard, the main unit 100 may transmit the digital signal to the framer 130 and frame the digital signal with a DAS frame. The DAS frame may be transmitted to at least one of the hub unit 200, the remote unit 300, and the TSN switch 400 through the transceiver 170 via the MAC/PHY 160.

The main unit 100 may convert the digital signal received from the converting module 117 and may resample the digital signal at the resampler 140, if necessary. For example, when the Ethernet module 115 of the main unit 100 receives a digital signal of a CPRI standard, the converting module 117 converts the digital signal into the eCRPI standard, and if resampling is necessary, the digital signal may be transmitted to the resampler 140 and resampled. The converted digital signal or the resampled digital signal may be transmitted to the framer 130 and framed into a DAS frame. The DAS frame may be transmitted to at least one of the hub unit 200, the remote unit 300, and the TSN switch 400 through the transceiver 170 via the MAC/PHY 160.

When the main unit 100 receives an uplink packet through the transceiver 170, the main unit 100 may deframe the uplink packet at the framer 130 via the MAC/PHY 160. In an embodiment, the deframed packet may be transmitted to the source 1 through the RF module 110 via the ADC/DAC 120. In another embodiment, the deframed packet may be transmitted to the source 1 through the Ethernet module 115. In this case, the format of the deframed packet may be converted in the converting module 117 as needed.

Figure 8:
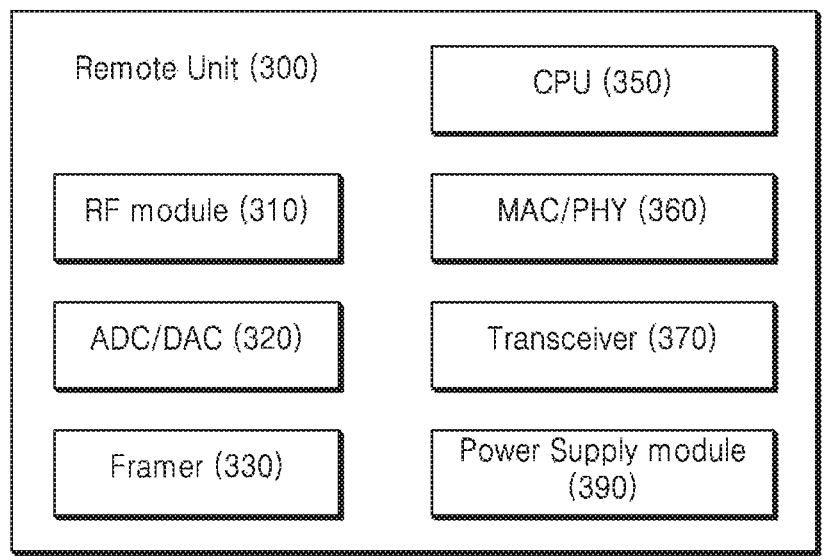
FIG. 8 is a block diagram of a configuration of a remote unit according to various embodiments.

FIG. 8 is a block diagram of a configuration of the remote unit 300 according to various embodiments.

Referring to FIG. 8, the remote unit 300 may include an RF module 310, an ADC/DAC 320, a framer 330, a CPU 350, a MAC/PHY 360, a transceiver 370, and a power supply module 390.

The RF module 310 may transmit an RF signal to a terminal (not shown) within coverage and may receive the RF signal from the terminal.

The RF module 310 may include an integrated antenna, and may include a duplexer filter or a band pass filter (BPF) filter.

The RF module 310 may amplify and filter a downlink RF signal.

The RF module 310 may filter and amplify an uplink RF signal.

The RF module 310 may select connection between an internal antenna and an external antenna port and use thereof.

In addition, the RF module 310 may include a mechanical connector for selection between the internal antenna and the external antenna port.

The internal antennas integrated in the RF module 310 may be included in various combinations.

The ADC/DAC 320 may perform conversion between analog and digital signals. For example, the ADC/DAC 320 may convert an analog signal to a digital signal and a digital signal to an analog signal.

The framer 330 may perform Ethernet framing and deframing.

The CPU 350 may process various operations related to the operation of the remote unit 300.

In addition, the CPU 350 may execute instructions related to the function of the remote unit 300.

The MAC/PHY 360 may include a MAC and a PHY.

The MAC/PHY 360 may encode received data or decode the encoded data. The MAC/PHY 360 may convert signals or data to conform to a transmission method.

The MAC/PHY 360 may transmit and receive an Ethernet packet. For example, the MAC/PHY 360 may exchange an Ethernet packet with at least one of the main unit 100, the hub unit 200, and the TSN switch 400, to which the remote unit 300 is connected, through the transceiver 370.

The transceiver 370 may interface the RF module 310 with at least one of the main unit 100, the hub unit 200, another remote unit, and the TSN switch 400.

Furthermore, the transceiver 370 may support extension for interfacing with the other main unit. Accordingly, through the transceiver 370, the remote unit 300 may be connected to the other remote unit and may serve as an extended remote unit.

The remote unit 100 may aggregate a signal received from the RF module 110 under the control of the TSN controller 500 and may distribute the signal to at least one of the main unit 100, the hub unit 200, the other remote unit, and the TSN switch 400.

For example, the transceiver 370 may connect a signal aggregated through at least one of an optic port and an Ethernet port to at least one of the main unit 100, the hub unit 200, the other remote unit, and the TSN switch 400, and may distribute a packet aggregated under the control of the remote unit 300 and the TSN controller 500 to at least one of the connected main unit 100, the hub unit 200, and the TSN switch 400.

The remote unit 300 may also perform noise rejection filtering and rate conversion. For example, a DSP (not shown) included in the remote unit 300 may perform rate conversion and a filter (not shown) included in the remote unit 300 may perform noise rejection filtering.

The remote unit 300 may perform band allocation according to signal transmission or may perform sectorization under the control of the TSN controller 500.

In addition, the remote unit 100 may perform SISO/MIMO signal routing under the control of the TSN controller 500.

Operations according to the control of the TSN controller 500 have been described in the description of the main unit 100, and thus detailed descriptions thereof will not be given herein.

The power supply module 390 may convert input and output power. For example, the power supply module 390 may convert the input and output power from alternating current (AC) to direct current (DC) or from DC to AC.

A configuration according to the operation of the main unit 300 will be described with reference to FIG. 7.

Figure 9:
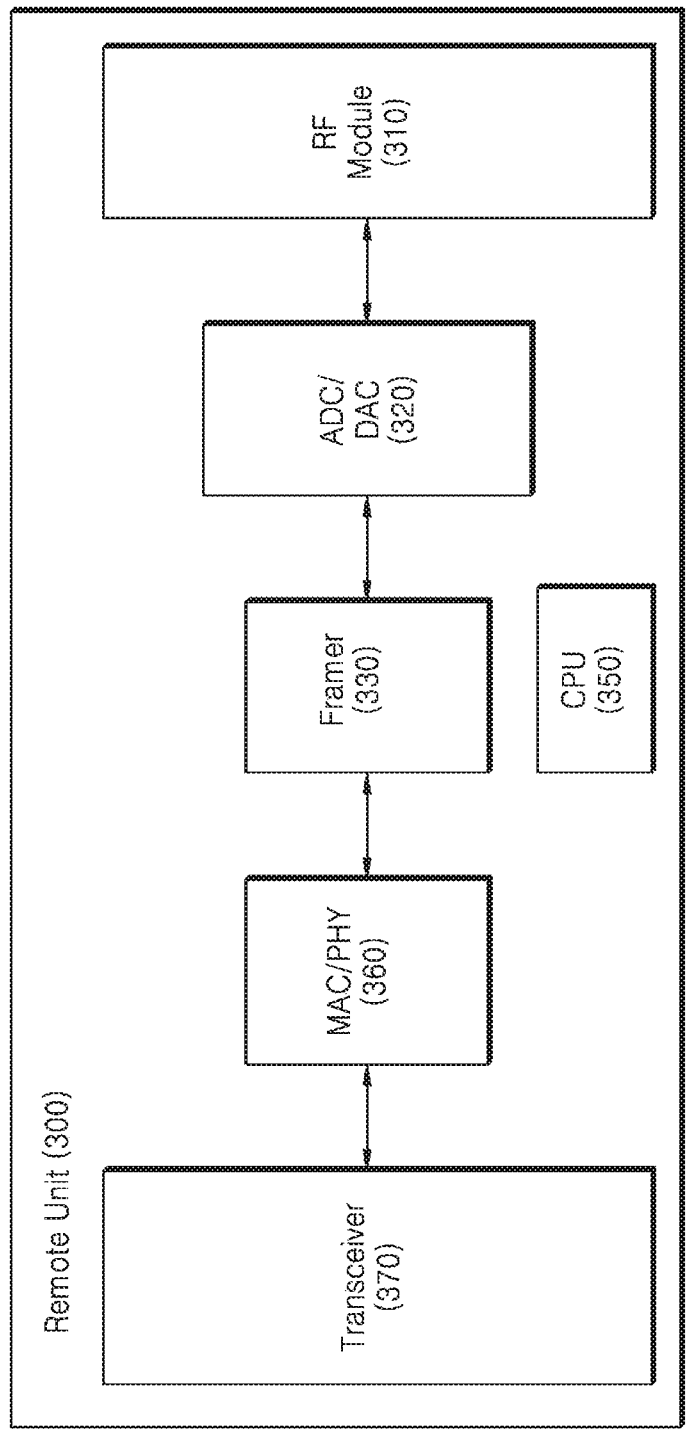
FIG. 9 is a conceptual diagram of a remote unit according to various embodiments.

FIG. 9 is a conceptual diagram of the remote unit 300 according to various embodiments.

Referring to FIG. 9, when the remote unit 300 receives a downlink packet through the transceiver 370, the remote unit 300 may deframe the downlink packet at the framer 330 via the MAC/PHY 360. The deframed packet may be transmitted to a terminal (not shown) within the coverage through the RF module 310 via the ADC/DAC 320.

When the remote unit 300 receives an uplink signal through the RF module 210 from the terminal (not shown) within the coverage, the remote unit 300 may frame the uplink signal at the framer 330 via the ADC/DAC 320. The framed uplink signal may be transmitted to at least one of the main unit 100, the hub unit 200, an upper level remote unit, and the TSN switch 400 through the transceiver 370 via the MAC/PHY 360.

Figure 10:
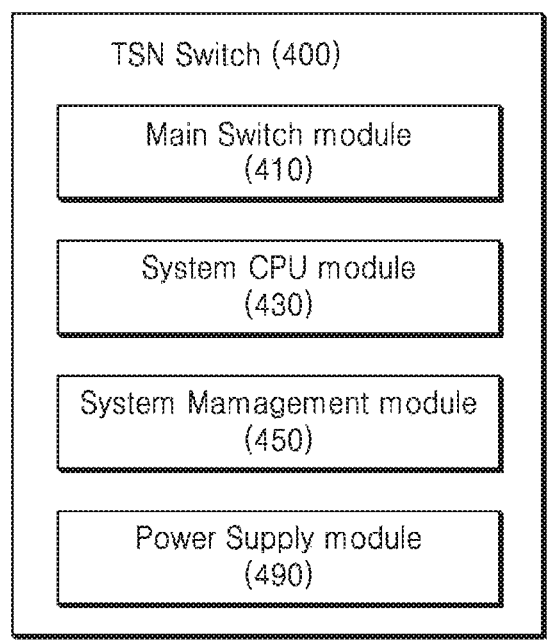
FIG. 10 is a block diagram of a configuration of a TSN switch according to various embodiments.

FIG. 10 is a block diagram of a configuration of the TSN switch 400 according to various embodiments.

Referring to FIG. 10, the TSN switch 400 may include a main switch module 410, a system CPU module 430, a system management module 450, and a power supply module 490.

The main switch module 410 may switch an Ethernet packet.

For example, the main switch module 410 may switch each of uplink packet/downlink packet to be transmitted according to a flow.

The main switch module 410 may switch flows based on received schedule information. Here, the schedule information may be received from a scheduler or the TSN controller 500.

The system CPU module 430 may control the overall operation of the TSN switch 400.

For example, the system CPU module 430 may perform an operation related to TSN synchronization of the TSN switch 400 and an operation related to the flow switching. Also, the system CPU module 430 may perform an operation for obtaining scheduling information.

The system management module 450 may manage a system of the TSN switch 400.

The system CPU module 430 and the system management module 450 may be composed of one module or a plurality of modules. Accordingly, the system CPU module 430 and the system management module 450 may be integrated.

The TSN switch 400 may further include an input/output (IO) module (not shown). The IO module may include an input/output port. The IO module may be included in the main switch module 410.

The TSN switch 400 may be connected to another node through the IO module.

The TSN switch 400 may further include a fan module (not shown) for cooling.

The power supply module 490 may supply power to the TSN switch 400.

The power supply module 490 may convert input and output power. For example, the power supply module 390 may convert the input and output power from AC to DC or from DC to AC.

Meanwhile, at least one of the main unit 100, the hub unit 200, the remote unit 300, and the TSN switch 400 described above may include an uplink summation module 600 (see FIGS. 11A to 11C) for summing uplink packets.

The uplink summation module 600 may sum a plurality of uplink Ethernet packets.

The uplink summation module 600 may sum the uplink Ethernet packets and output the summed uplink Ethernet packets at a provided location. The summed uplink Ethernet packets may be transmitted in an uplink direction.

The uplink summation module 600 will be described with reference to FIGS. 11A to 11C.

Figure 11A:
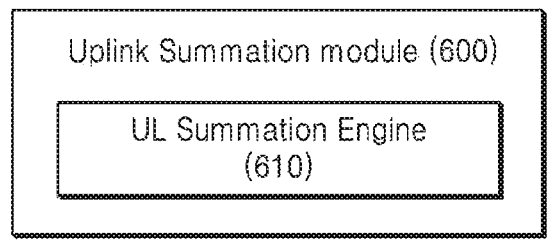
FIGS. 11A to 11C are block diagrams of a configuration of an uplink summation module according to various embodiments.
Figure 11B:
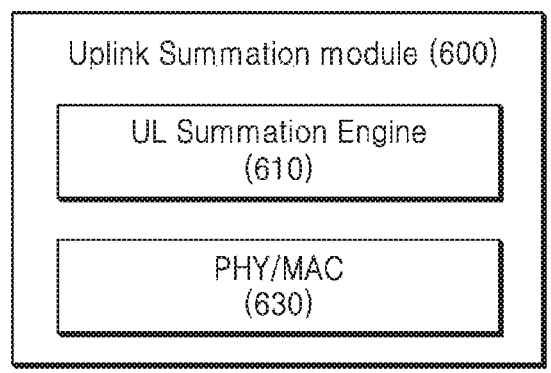
Figure 11C:
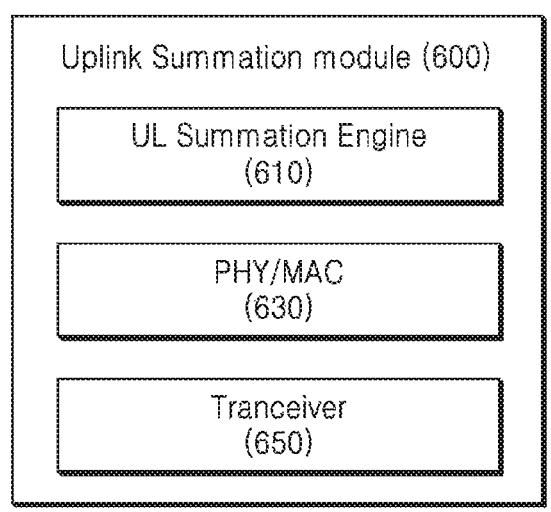

FIGS. 11A to 11C are block diagrams of a configuration of the uplink summation module 600 according to various embodiments.

Referring to FIGS. 11A to 11C, the uplink summation module 600 may be implemented in a form including various configurations.

In a first embodiment, referring to FIG. 11A, the uplink summation module 600 may include an uplink (UL) summation engine 610.

In a second embodiment, referring to FIG. 11B, the uplink summation module 600 may include the UL summation engine 610 and a PHY/MAC 630.

In a third embodiment, referring to FIG. 11C, the uplink summation module 600 may include the UL summation engine 610, the PHY/MAC 630, and a transceiver 650.

As such, the uplink summation module 600 may be implemented in various forms according to locations and connected configurations.

The UL summation engine 610 may sum a plurality of uplink Ethernet packets.

The UL summation engine 610 may serve as a payload/worker.

The UL summation engine 610 may normalize and time-align the uplink Ethernet packets. The summed uplink Ethernet packets in the UL summation engine 610 may thus be normalized and time-aligned. This will be described later below.

The PHY/MAC 630 may include a PHY and an MAC.

The PHY/MAC 630 may encode received data or decode the encoded data.

The PHY/MAC 630 may convert signals or data to conform to a transmission method.

The PHY/MAC 630 may transmit and receive an Ethernet packet.

The transceiver 650 may interface with other devices. For example, the transceiver 650 may interface with the TSN switch 400, the remote unit 300, etc. connected to a configuration in which the uplink summation module 600 is included.

Figure 12:
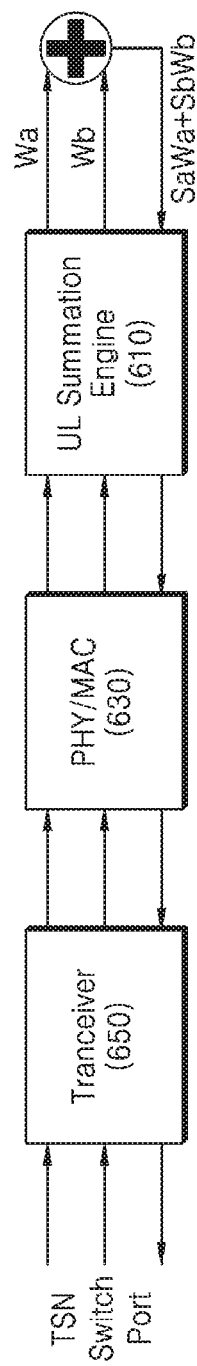
FIG. 12 is a conceptual diagram of uplink summation according to various embodiments.

FIG. 12 is a conceptual diagram of uplink summation according to various embodiments.

FIG. 12 is an example of uplink summation in the case of PHY-to-PHY connection.

Referring to FIG. 12, the transceiver 650 of the uplink summation module 600 may receive a plurality of uplink Ethernet packets from a port of the TSN switch 500, which is connected to the transceiver 650 through an optical link or internal connection. The plurality of uplink Ethernet packets may be Ethernet packets transmitted from a plurality of different remote units 300. In more detail, the plurality of uplink Ethernet packet may refer to a plurality of uplink Ethernet packets transmitted from a plurality of remote units requiring summation, and may refer to a plurality of uplink Ethernet packets with different flows.

A plurality of uplink Ethernet packets received through the transceiver 650 may be transmitted to the UL summation engine 610 via the PHY/MAC 630.

The UL summation engine 610 may weight each of the transmitted uplink Ethernet packets and normalize the uplink Ethernet packets.

In addition, the UL summation engine 610 may time-align the plurality of uplink Ethernet packets.

For example, the UL summation engine 610 may assign different weights $Wa(x)$ and $Wb(x)$ to the uplink Ethernet packets, respectively, and sum them, and may output a summed result $Sa(x)Wa(x)+Sb(x)Wb(x)$. In addition, the UL summation engine 610 may assign an identical weight to each of the uplink Ethernet packets and sum them.

Where $Si(x)$ is a packetized signal sampled at time t ($t=x$), $Wi(x)$ is the weight of $Si(x)$ at time t ($t=x$), and i may belong to a flow summation set.

As such, the UL summation engine 610 may normalize the uplink Ethernet packets through weighting on each of the uplink Ethernet packets.

The summation according to the weighting of the uplink summation module 600 will be described in detail.

First, weight distribution of the TSN controller 500 by node and uplink summation using the distributed weights will be described with respect to FIG. 13.

Figure 13:
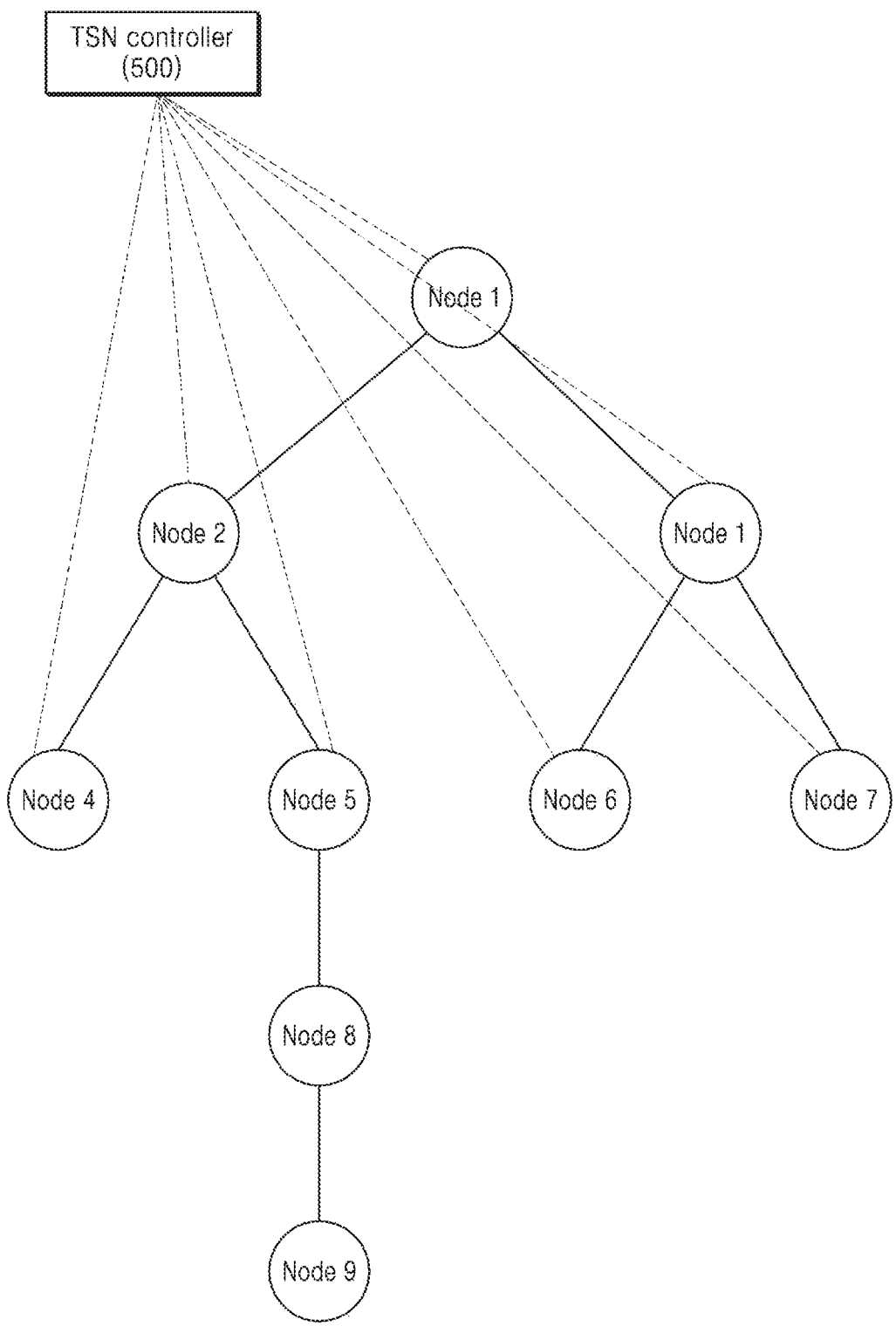
FIG. 13 is a conceptual diagram of weight distribution according to various embodiments.

FIG. 13 is a conceptual diagram of weight distribution according to various embodiments.

Nodes shown in FIG. 13 may be one of the configurations in the distributed antenna system 10. For example, each of the nodes may be one of the main unit 100, the hub 200, the remote unit 300, and the TSN switch 500.

Referring to FIG. 13, the TSN controller 500 may distribute a weight to each node in the distributed antenna system 10. For example, the TSN controller 500 may distribute weights to the first through ninth nodes, respectively. The weights to be distributed here may be the same as or different from each other. The TSN controller 500 may also dynamically distribute the weights to the nodes, respectively.

The TSN controller 500, based on a flow of each of a plurality of uplink Ethernet packets to be summed and nodes passing according to the flows, may assign a weight to each of the nodes on the corresponding flow. In addition, the TSN controller 500 may distribute a weight for uplink summation to each node based on collected network telemetry.

Based on the above description, weighting in the uplink summation module 600 and summation of a plurality of uplink Ethernet packets will be described.

In an embodiment, the uplink summation module 600 may sum a plurality of uplink Ethernet packets based on a weight distributed to each node. For example, the TSN controller 500 may distribute a weight for each node, and the uplink summation module 600 corresponding to each node may sum a plurality of uplink Ethernet packets using the weight distributed to the corresponding node.

In a specific embodiment, the TSN controller 500 may distribute a weight $W/n$, which is obtained by dividing a total weight W to be distributed on one path by the number n of nodes on the corresponding path, to the nodes on the corresponding path. The uplink summation module 600 corresponding to the nodes to which the weight $W/n$ is distributed may sum the plurality of uplink Ethernet packets at the corresponding node by using the distributed weight $W/n$.

In another specific embodiment, the TSN controller 500 may distribute different weights to nodes on one path, respectively. The sum of the different weights respectively distributed to the nodes may be a total weight W.

The uplink summation module 600 corresponding to the nodes to which the weight $W/n$ is distributed may sum the plurality of uplink Ethernet packets at the corresponding node by using the distributed weight $W/n$.

The above-described weights respectively distributed to the nodes may be dynamically distributed.

In addition, the uplink summation module 600 may combine the plurality of uplink Ethernet packets by using maximal ratio combining.

For example, each uplink summation module 600 corresponding to each node in the distributed antenna system 10 may multiply each of the plurality of uplink Ethernet packets to be received or transmitted to the corresponding node by an appropriate weight and may sum the uplink Ethernet packets multiplied by the weights.

The UL summation engine 610 may time-align each of the uplink Ethernet packets.

In more detail, the UL summation engine 610 may time-align each of the plurality of uplink Ethernet packets such that time synchronization of the plurality of uplink Ethernet packets is the same. The UL summation engine 610 may align the plurality of uplink Ethernet packets based on a time stamp of each of the plurality of uplink Ethernet packets. Thus, the UL summation engine 610 may align uplink Ethernet packets corresponding to an identical time stamp. In this case, the UL summation engine 610 may time-align each of the plurality of uplink Ethernet packets by using a time stamp with a good resolution.

For example, the UL summation engine 610 may time-weight each of the plurality of received uplink Ethernet packets to time-align the uplink Ethernet packets.

The UL summation engine 610 may assign a time weight differently for each uplink Ethernet packet for time alignment.

Uplink Ethernet packets summed in the uplink summing engine 610 may be transmitted to the transceiver 650 via the PHY/MAC 630.

The transceiver 650 may transmit the summed uplink Ethernet packets to the TSN switch 500. Accordingly, the TSN switch 500 may transmit the summed uplink Ethernet packets in an uplink direction.

As the plurality of uplink Ethernet packets are summed and transmitted in the uplink summation module 600, the distributed antenna system 10 according to various embodiments may utilize a bandwidth while utilizing an Ethernet frame.

The above-described uplink summation module 600 may be included in the TSN switch 500 or the remote unit 300.

In an embodiment, the uplink summation module 600 may be a configuration included in one node. For example, the uplink summation module 600 may be included in the TSN switch 500, thereby reducing forward delay. In more detail, when the uplink summation module 600 is included in the TSN switch 500, PHY-to-PHY delay may be reduced. This may mean delay ② according to reception and transmission shown in FIG. 15.

In another embodiment, the uplink summation module 600 may be an independent configuration not included in one node. For example, the uplink summation module 600 may receive uplink Ethernet packets of an uplink summation object from at least one of the nodes, and may sum and output at least some of the received uplink Ethernet packets. In this case, the uplink summation module 600 may have a large capacity for summing up a large number and a large amount of uplink Ethernet packets. For example, the uplink summation module 600 having a large capacity may be connected to a plurality of nodes to perform the same function as the main unit 100 described above.

Figure 14:
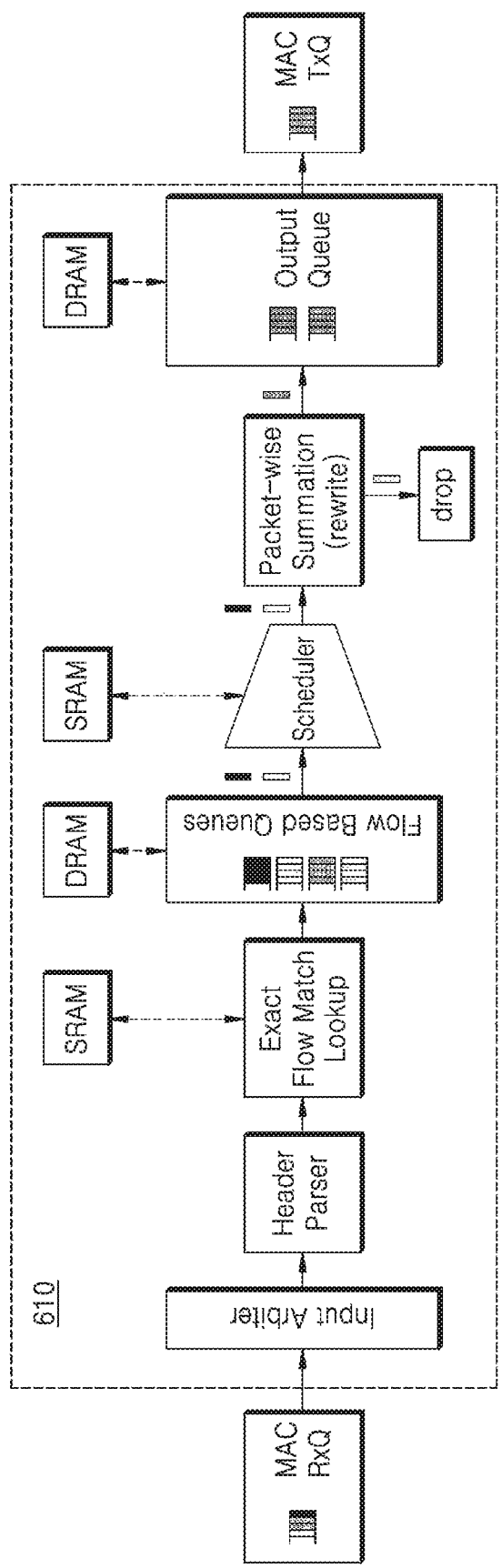
FIG. 14 is a conceptual diagram of a configuration of an uplink summation engine according to various embodiments.

A configuration of the UL summation engine 610 will be described with reference to FIG. 14, FIG. 14 is a conceptual diagram of a configuration of a UL summation engine according to various embodiments.

FIG. 14 is an example of uplink summation in the case of MAC-to-MAC connection.

Referring to FIG. 14, when the UL summation engine 610 receives a plurality of uplink Ethernet packets according to the MAC-to-MAC connection from the PHY/MAC 630, the UL summation engine 610 may perform header parsing of each of the uplink Ethernet packets via an input arbiter.

The UL summation engine 610 may extract flows that match a lookup in a plurality of uplink Ethernet packets that are header analyzed.

The UL summation engine 610 may classify the extracted flows based on queues.

The UL summation engine 610 may schedule the classified flows and may perform packet-wise summation. The UL summation engine 610 may rewrite for the packet-wise summation. Further, the UL summation engine 610 may drop packets that are the basis of summation. The summation may refer to summation of payloads included in the packets.

The UL summation engine 610 may transmit the packet-wise summed uplink Ethernet packets to the PHY/MAC 630 via an output queue. The packet-wise summed uplink Ethernet packets may be transmitted to the TSN switch 500 via the PHY/MAC 630.

The above-described configurations of the UL summation engine 610 may be implemented by a field programmable gate array (FPGA).

The summation of a plurality of uplink Ethernet packets will be described.

The uplink summation module 600 may sum a portion of each of a plurality of flows in the same flow and the same time period based on a flow ID and a time stamp of a queue head of each of a plurality of received Ethernet packets. For example, the uplink summation module 600 may sum portions of respective streams corresponding to the plurality of Ethernet packets. Here, the uplink summation module 600 may sum portions of respective streams corresponding to the plurality of Ethernet packets in consideration of the time difference based on the time stamp. The uplink summation module 600 may perform summation in units of symbols or blocks, and may sum the same times based on a window indicating a constant same time period.

The uplink summation module 600 may cut out only a part of a frame in each of a plurality of Ethernet packets to be summed, and may sum the cut-out parts. For example, the uplink summation module 600 may cut out payloads to be summed in the same time period in an object frame of each of the plurality of Ethernet packets to be summed, and may sum the cut-off payloads.

When a summation object is composed of only payloads, the uplink summation module 600 may cut out only a part of the summation object in the same time period regardless of a frame unit, and may sum the cut-out parts.

For example, the uplink summation module 600 may sum a plurality of Ethernet packets based on a certain window. The uplink summation module 600 may confirm a time stamp of each of a plurality of Ethernet packets included in one window and may align Ethernet packets at the same time. Also, the uplink summation module 600 may remove an Ethernet head of each of the plurality of Ethernet packets at the same time and may sum only payloads. Accordingly, the present disclosure may generate summed uplink Ethernet packets in which Ethernet heads including identical information is removed and only payloads are combined, and may transmit the uplink Ethernet packet to which payloads are combined, thus making efficient use of a bandwidth. In particular, when a payload size of an Ethernet packet is less than or similar to the size of an Ethernet head, bandwidth efficiency may be greatly improved by removing an unnecessary redundant portion of the Ethernet head.

Meanwhile, summation of the plurality of Ethernet packets of the uplink summation module 600 may be variously applied according to a structure of an Ethernet packet frame and the like. However, as described above, a plurality of Ethernet packets may be summed by removing redundant Ethernet heads and summing only payloads.

The uplink summation module 600 according to various embodiments may determine whether to sum at least some of a plurality of received uplink Ethernet packets in consideration of at least one of a state of the plurality of received uplink Ethernet packets, a layer in which the uplink summation module 600 is located, and a state of the distributed antenna system 10, and may sum the plurality of uplink Ethernet packets according to the determination.

In more detail, the uplink summation module 600, at a layer of a node to which or in which the uplink summation module 600 is connected or included, may determine which of a case of transmitting the plurality of received uplink Ethernet packets without summing and a case of summing and transmitting the plurality of uplink Ethernet packets is advantageous in terms of latency and bandwidth.

Here, a layer may refer to one layer in a multi-hierarchy structure or one level in multiple levels. A node to which the uplink summation module 600 is connected may also be referred to as an aggregation node.

For example, the uplink summation module 600, based on a network state, may determine which of a case of transmitting the plurality of received uplink Ethernet packets without summing and a case of summing and transmitting the plurality of uplink Ethernet packets is advantageous in terms of latency and bandwidth.

In an embodiment, the uplink summation module 600, based on various information collected through telemetry as described above, may determine whether it is advantageous to sum and transmit uplink Ethernet packets or to transmit uplink Ethernet packets without summation, in terms of latency and bandwidth. In more detail, the uplink summation module 600 may determine whether to sum and transmit at least a portion of a plurality of uplink Ethernet packets transmitted to the uplink summation module 600 or to transmit the same without summation, based on information such as a communication state, a network state, and the like in the distributed antenna system 10 collected from the TSN controller 500.

Meanwhile, the uplink summation module 600 may perform uplink summation under the control of the TSN controller 500 without directly determining the uplink summation. For example, the TSN controller 500 may determine whether to perform uplink summation of at least one uplink summation module 600 in the distributed antenna system 10 based on a network state, and may control an uplink summation operation of the at least one uplink summation module 600 in the distributed antenna system 10 according to a result of the determination.

In general, in a delivery tree of multiple levels in the distributed antenna system 10, the sum of uplink Ethernet packets transmitted in an uplink direction is advantageous to sum uplink flows at the last layer or level from the viewpoint of delay and is advantageous to sum uplink flows at each layer or level requiring summation from the viewpoint of bandwidth.

In particular, in the case of an uplink, since there is a relationship of multiple sources to single destination from the plurality of remote units 300 to one main unit 100, this may cause a problem of multiple flows to be mapped a single flow.

Therefore, the distributed antenna system 10 according to various embodiments may determine whether at least one of the TSN controller 500 and the uplink summation module 600 sums uplink Ethernet packets and may determine a level at which the uplink Ethernet packets are summed, and may sum and transmit a plurality of uplink Ethernet packets at the determined level. Where the level refers to one level on the delivery tree of multiple levels in the distributed antenna system 10 and may refer to the above-described layer.

In addition, it is determined whether the TSN switch 400, which is connected to or includes the uplink summation module 600, sums a plurality of uplink Ethernet packets at a corresponding level. For example, the system CPU module 430 of the TSN switch 400 may determine whether to perform uplink summation at a corresponding level.

First, determination of uplink Ethernet packet summation of the uplink summation module 600 will be described.

Figure 15:
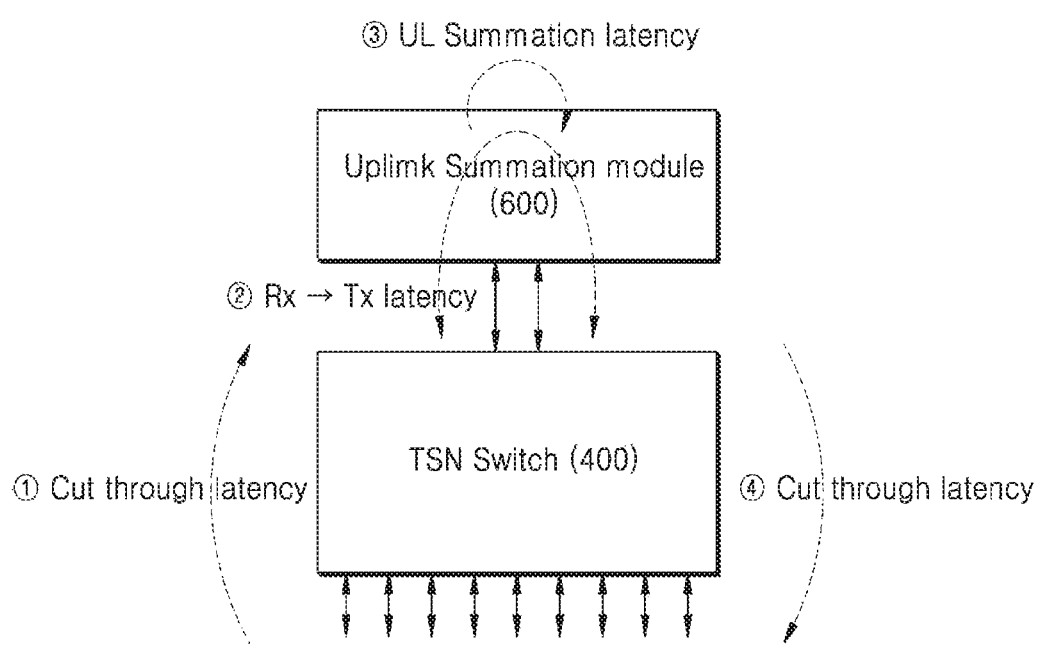
FIG. 15 is a conceptual diagram of delay in an uplink summation module according to various embodiments.

FIG. 15 is a conceptual diagram of delay in an uplink summation module according to various embodiments.

Referring to FIG. 15, the TSN switch 400 included in the distributed antenna system 10 may be located at one level on a delivery tree of multiple levels. For example, the TSN switch 400 may be located at a level between the main unit 100 and the remote unit 300.

The TSN switch 400 may be connected to the uplink summation module 600 for summing at a corresponding level. The uplink summation module 600 may be included in the TSN switch 400.

The uplink summation module 600 may determine whether to sum a plurality of uplink Ethernet packets and may determine the summation operation in consideration of a level of the connected TSN switch 400 and delay according to a level on the delivery tree of multiple levels.

For example, delay that the uplink summation module 600 considers at a corresponding level may include cut through latency that occurs as the uplink summation module 600 cuts through the connected TSN switch 400, reception/transmission latency in the uplink summation module 600, UL summation latency due to a summation operation in the uplink summation module 600, and the like.

In more detail, referring to FIG. 15, at a level at which the TSN switch 400 is located, delay related to uplink Ethernet packets includes cut through latency ① occurring when uplink Ethernet packets is transmitted from a lower level to the TSN switch 400, reception/transmission latency ② due to transmission to the uplink summation module 600, summation latency 3 due to summation in the uplink summation module 600, and a cut through latency ④ for transmitting a summed signal upward through the TSN switch 400. Accordingly, latency that may occur when uplink summation is performed at a corresponding level may be ①+②+③+④. Also, latency that may occur when uplink transmission is performed without uplink summation at a corresponding level may be ①+② or ①+②+③.

Considering latency that may occur at each level on a delivery tree of multiple levels in the distributed antenna system 10 as described above, the TSN controller 500 or the uplink summation module 600 may determine whether to sum uplink Ethernet packets at each level.

In more detail, the uplink summation module 600 may calculate forward delay and summation delay of a plurality of uplink Ethernet packets and may determine whether to sum a plurality of received Ethernet uplink signals based on the calculated forward delay and summation delay.

Accordingly, the TSN controller 500 or the uplink summation module 600 may determine the summation of the uplink Ethernet packets to take full advantage of a bandwidth due to the summation of the plurality of uplink Ethernet packets while taking this delay into account.

Based on the above-described content of the uplink summation, uplink transmission will be described with reference to FIGS. 15 to 16.

Figure 16:
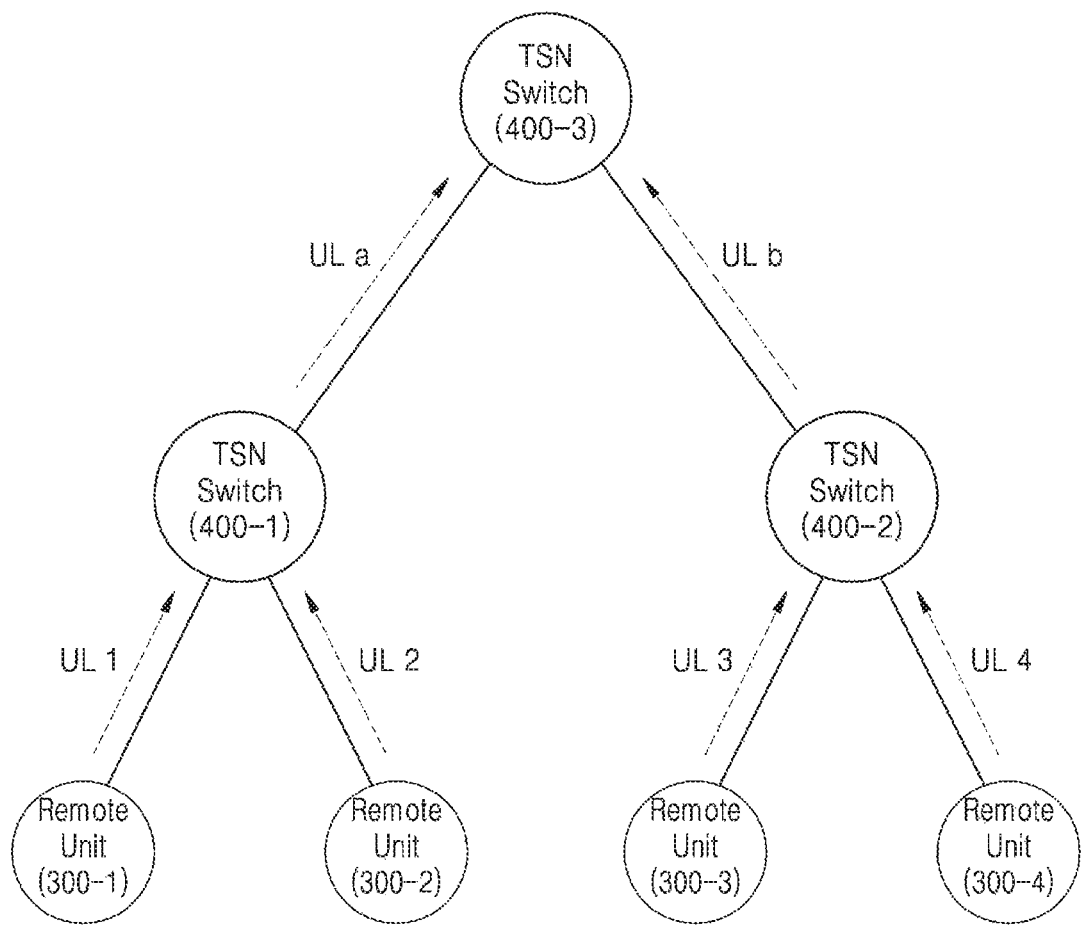
FIG. 16 is an exemplary view of uplink summation according to various embodiments.

FIG. 16 is an exemplary view of uplink summation according to various embodiments.

FIG. 16 is a view for explaining an embodiment in which uplink summation is performed in a TSN switch of a lower level according to determination of the TSN controller 500 or the uplink summation module 600.

Referring to FIG. 16, some levels of TSN switches 400-1, 400-2, and 400-3 and remote units 300-1, 300-2, 300-3, and 300-4 in the distributed antenna system 10 according to various embodiments may be located in respective level units.

The lowest level remote units 300-1, 300-2, 300-3, and 300-4 may be connected to the upper level TSN switches 400-1 and 400-2, respectively. The first TSN switch 400-1 and the second TSN switch 400-2 may be connected to the upper level third TSN switch 400-3.

The first TSN switch 400-1 may receive uplink Ethernet packets UL 1 and UL 2 from the first remote unit 300-1 and the second remote unit 300-2, respectively. According to control of the TSN controller 500 or determination of the uplink summation module 600 connected to or included in the first TSN switch 400-1, the first TSN switch 400-1 may transmit a summation uplink Ethernet packet UL a obtained by summing the first uplink Ethernet packet UL 1 and the second uplink Ethernet packet UL 2 to the upper level third TSN switch 400-3. Here, the summation of the first uplink Ethernet packet UL 1 and the second uplink Ethernet packet UL 2 may be performed by the uplink summation module 600 which is included in or connected to the first TSN switch 400-1.

The second TSN switch 400-2 may receive uplink Ethernet packets UL 3 and UL 4 from the third remote unit 300-3 and the fourth remote unit 300-4, respectively. According to control of the TSN controller 500 or determination of the uplink summation module 600 connected to or included in the second TSN switch 400-2, the second TSN switch 400-2 may transmit a summation uplink Ethernet packet UL b obtained by summing the third uplink Ethernet packet UL 3 and the fourth uplink Ethernet packet UL 4 to the upper level third TSN switch 400-3. Here, the summation of the third uplink Ethernet packet UL 3 and the fourth uplink Ethernet packet UL 4 may be performed by the uplink summation module 600 which is included in or connected to the second TSN switch 400-2.

As such, the first TSN switch 400-1 and the second TSN switch 400-2 may sum uplink Ethernet packets and transmit the summed uplink Ethernet packets to the upper level third TSN switch 400-3.

Figure 17:
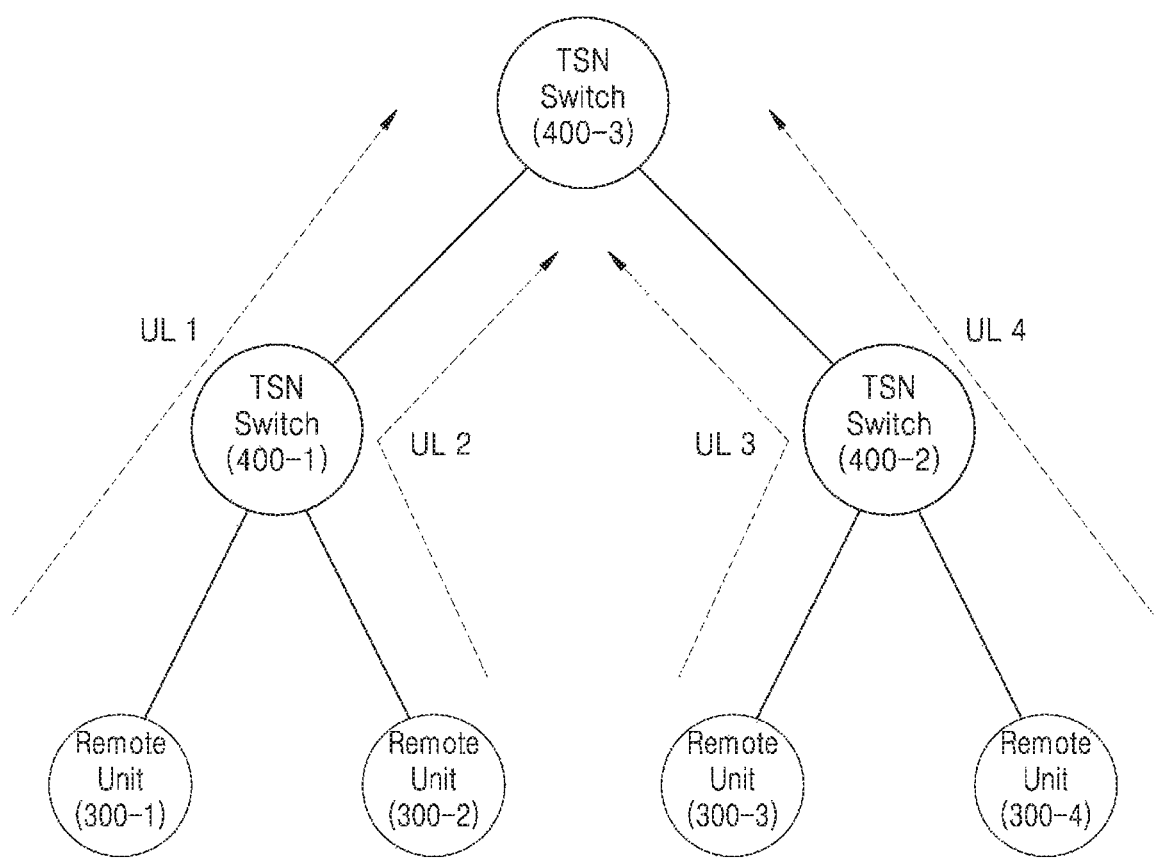
FIG. 17 is an exemplary view of uplink transmission according to various embodiments.

FIG. 17 is an exemplary view of uplink transmission according to various embodiments.

FIG. 17 is a view for explaining an embodiment in which uplink Ethernet packets are transmitted without uplink summation in a lower level TSN switch, according to determination of the TSN controller 500 or the uplink summation module 600.

Referring to FIG. 17, some levels of the TSN switches 400-1, 400-2, and 400-3 and the remote units 300-1, 300-2, 300-3, and 300-4 in the distributed antenna system 10 according to various embodiments may be located in respective level units.

The lowest level remote units 300-1, 300-2, 300-3, and 300-4 may be connected to the upper level TSN switches 400-1 and 400-2, respectively. The first TSN switch 400-1 and the second TSN switch 400-2 may be connected to the upper level third TSN switch 400-3.

The first TSN switch 400-1 may receive uplink Ethernet packets UL 1 and UL 2 from the first remote unit 300-1 and the second remote unit 300-2, respectively. According to control of the TSN controller 500 or determination of the uplink summation module 600 connected to or included in the first TSN switch 400-1, the first TSN switch 400-1 may transmit each of the first uplink Ethernet packet UL 1 and the second uplink Ethernet packet UL 2 to the upper level third TSN switch 400-3 without summation.

According to an embodiment, the first uplink Ethernet packet UL 1 and the second uplink Ethernet packet UL 2 may be transmitted to the upper level third TSN switch 400-3 without going through the uplink summation module 600 which is connected to or included in the first TSN switch 400-1.

The second TSN switch 400-2 may receive uplink Ethernet packets UL 3 and UL 4 from the third remote unit 300-3 and the fourth remote unit 300-4, respectively. According to control of the TSN controller 500 or determination of the uplink summation module 600 connected to or included in the second TSN switch 400-2, the second TSN switch 400-2 may transmit each of the third uplink Ethernet packet UL 3 and the fourth uplink Ethernet packet UL 4 to the upper level third TSN switch 400-3 without summation.

According to an embodiment, the third uplink Ethernet packet UL 3 and the fourth uplink Ethernet packet UL 4 may be transmitted to the upper level third TSN switch 400-3 without going through the uplink summation module 600 which is connected to or included in the second TSN switch 400-2.

Uplink summation at multiple levels will be described in more detail with reference to FIGS. 17 and 18.

Figure 18:
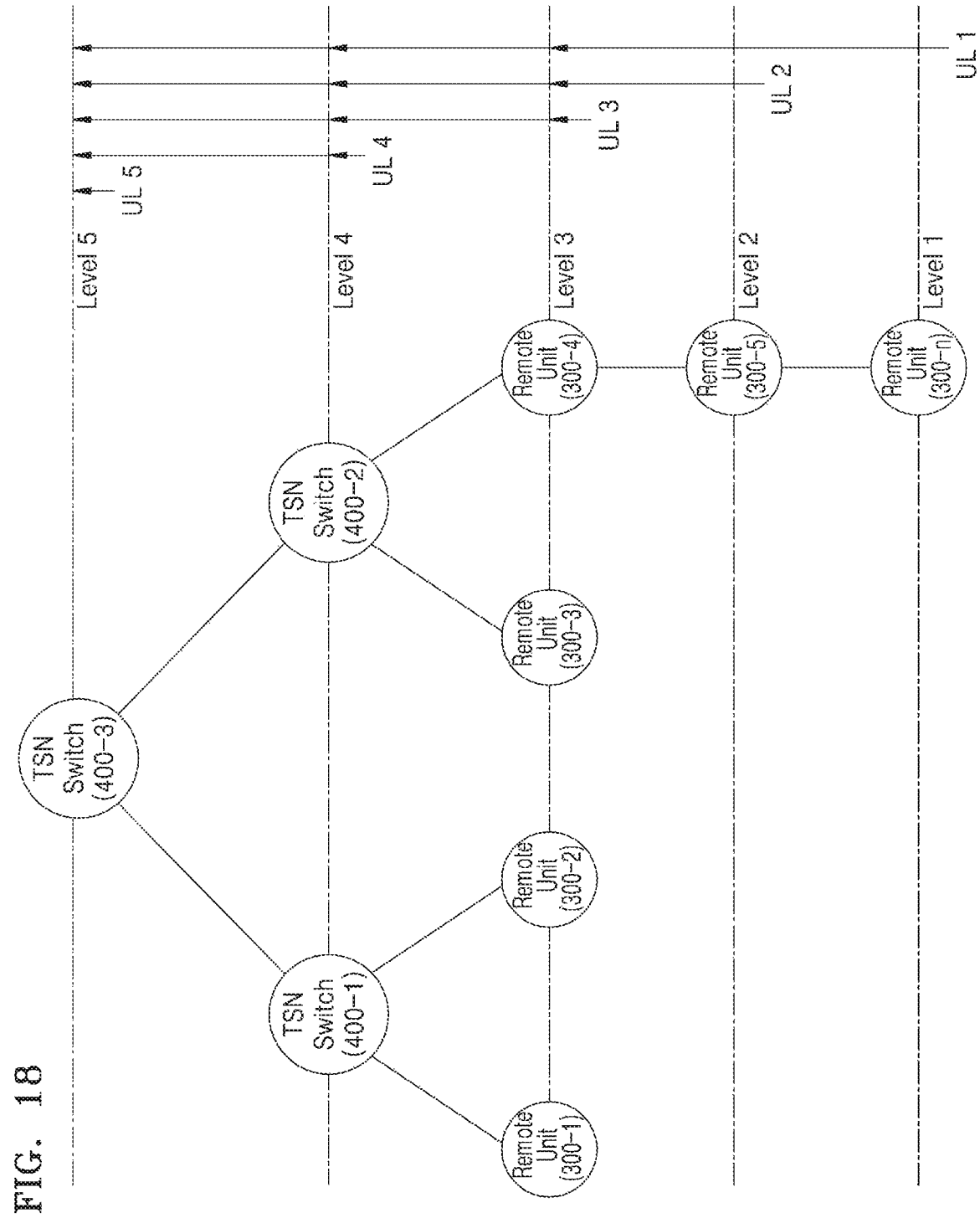
FIG. 18 is a conceptual diagram of uplink transmission at multiple levels in a distributed antenna system according to various embodiments.

FIG. 18 is a conceptual diagram of uplink transmission at multiple levels in the distributed antenna system 10 according to various embodiments.

FIG. 18 may represent only some of the levels of a delivery tree of multiple levels in the distributed antenna system 10.

Referring to FIG. 18, the remote units 300-1 to 300-*n* may be located at a first level, which is the lowest level, and a second level and a third level, which are upper levels of the first level, and TSN switches 400-1, 400-2, and 400-3 may be located at a fourth level and a fifth level.

The TSN switches 400-1, 400-2, and 400-3 and the remote units 300-1, 300-2, 300-3, 300-4, and 300-5 for receiving uplink Ethernet packets transmitted at lower levels may include the uplink summation module 600 or may be connected to the uplink summation module 600 at each level, and may determine whether to sum the received lower level uplink Ethernet packets and an uplink Ethernet packet of a corresponding level at each level.

For example, the fourth remote unit 300-4 of the third level may receive the second uplink Ethernet packet UL 2 of the fifth remote unit 300-5 and an $n^{th}$ uplink Ethernet packet UL n of the $n^{th}$ remote unit 300-*n* from the fifth level remote unit 300-5 of the second level, and may determine whether to sum the uplink Ethernet packets UL 1, UL 2, and UL 3 at the third level. Then, according to a result of the determination, the fourth remote unit 300-4 may transmit summed uplink Ethernet packets or unsummed uplink Ethernet packets to the fourth level TSN switch, which is an upper level.

As described above, the distributed antenna system 10 configured in the form of a delivery tree of multiple levels may determine whether to sum uplink Ethernet packets transmitted from a lower level at each level, and may sum the uplink Ethernet packets according to a result of the determination and transmit the uplink Ethernet packets to an upper level or may transmit the uplink Ethernet packets to an upper level without summation. The distributed antenna system 10 may also sum only some of the plurality of uplink Ethernet packets and may transmit the summed uplink Ethernet packets and the remaining uplink Ethernet packets to an upper level.

As described above, the distributed antenna system according to various embodiments, in each level configured in the form of a delivery tree of multiple levels, may determine whether to sum uplink Ethernet packets in an uplink summation module included in or connected to a corresponding node or a node, and may sum the uplink Ethernet packets according to a result of the determination and transmit the uplink Ethernet packets to an upper level.

Uplink summation according to determination and control of the TSN controller 500 will be described with reference to FIG. 19.

Figure 19:
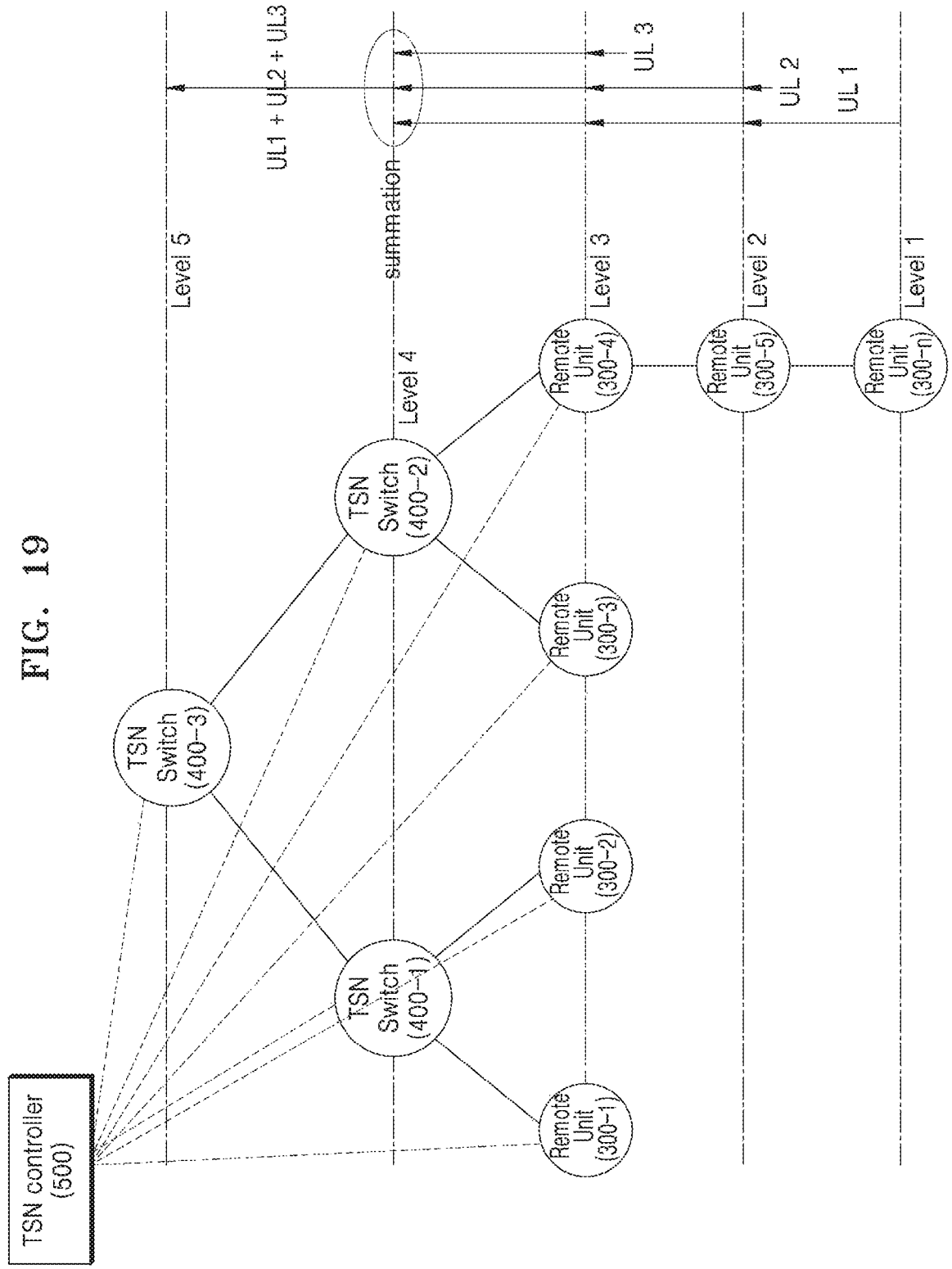
FIG. 19 is a conceptual diagram of uplink summation control of a TSN controller according to various embodiments.

FIG. 19 is a conceptual diagram of uplink summation control of the TSN controller 500 according to various embodiments.

Referring to FIG. 19, the TSN controller 500 of the distributed antenna system 10 may obtain state information from each of nodes at which uplink summation is possible and may determine for uplink Ethernet packet summation at each node. Also, the TSN controller 500 may control uplink Ethernet packet summation for each node according to a result of the determination. In addition, the TSN controller 500 may control not only the uplink Ethernet packet summation but also flow allocation and switching operations. The TSN controller 500 may also obtain state information from a node at which uplink summation is impossible and may control the node.

In an embodiment, referring to FIG. 18, the TSN controller 500 may receive state information from the TSN switches 400-1, 400-2, and 400-3 respectively located at a plurality of levels and the remote units 300-1, 300-2, 300-3, and 300-4 of nodes at which uplink summation is possible.

Based on the received information, the TSN controller 500 may determine whether uplink summation is possible at each node, and may control the uplink summation at each node based on a result of the determination.

For example, the TSN controller 500 may determine whether summation is performed at each node considering latency and a bandwidth due to the summation.

In an embodiment, the TSN controller 500 may respectively control uplink Ethernet packets to be transmitted to an upper level without summation at the second level and the third level, and may control the received uplink Ethernet Packets UL1, UL2, and UL3 to be summed at the second TSN switch 400-2 of the fourth level. Accordingly, the uplink summation module 600 of the second TSN switch 400-2 may sum the received uplink Ethernet packets UL 1, UL 2, and UL 3, and the second TSN switch 400-2 may transmit the summed uplink Ethernet packets to the upper level third TSN switch 400-3.

As such, the TSN controller 500 may determine, in the distributed antenna system 10 implemented with TSN/Ethernet, uplink summation at each of nodes configured at multiple levels, and may control each of the nodes such that uplink summation is performed at each node according to the determination.

In addition, the TSN controller 500 may control each of the nodes to sum all uplink Ethernet packets or to sum only some of the all uplink Ethernet packets when performing the uplink summation.

For example, when the TSN controller 500 determines that the summation of only some uplink Ethernet packets by the second TSN switch 400-2 is advantageous in terms of bandwidth and latency, the TSN controller 500 may control the second TSN switch 400-2 to sum and transmit only some uplink Ethernet packets determined to be advantageous.

In a specific embodiment, the TSN controller 500 may control the second TSN switch 400-2 to sum only the first uplink Ethernet packet UL 1 and the second uplink Ethernet packet UL 2, which are some of the received uplink Ethernet packets UL 1, UL 2, and UL 3, and to transmit the third uplink Ethernet packet UL 3 without summation. Accordingly, the uplink summation module 600 of the second TSN switch 400-2 may sum the first uplink Ethernet packet UL 1 and the second uplink Ethernet packet UL 2, which are some of the received uplink Ethernet packets, and the second TSN switch 400-2 may transmit the summed uplink Ethernet packets (UL 1+UL 2) and the third uplink Ethernet packet UL 3 to the upper level third TSN switch 400-3.

The TSN controller 500 according to various embodiments may determine a flow of each uplink Ethernet packet as well as determine whether uplink summation is performed at each level of nodes.

Accordingly, the TSN controller 500 may determine a flow for each of the main unit 100, the hub unit 200, the remote unit 300, and the TSN switch 400 included in the distributed antenna system 10, and may determine whether or not the uplink Ethernet packets are summed. The TSN controller 500 may transmit information about the determined flow and summation to each of the main unit 100, the hub unit 200, the remote unit 300, and the TSN switch 400 and may control the information.

Thus, the distributed antenna system 10 according to various embodiments may control the TSN controller 500 to determine and allocate a flow, which is a path through which uplink Ethernet packets are transmitted, and may control the configurations included in the distributed antenna system 10 to operate according to the allocated flow.

In the above description, an uplink summation object is referred to as an uplink Ethernet packet or an uplink packet for ease of explanation. However, as described above, the uplink Ethernet packet may be an uplink transmission Ethernet packet transmitted from a terminal to a source such as a base station.

The uplink Ethernet packet may also refer to packets according to a framed radio signal stream, the packets digitized using Ethernet technology.

Also, the radio signal stream may be mapped to a flow. Thus, the above-described uplink Ethernet packets may be referred to as an uplink flow.

Therefore, the uplink Ethernet packet described above may mean either an uplink radio signal stream, an uplink stream, an uplink Ethernet stream, an uplink Ethernet frame, an uplink frame, an uplink Ethernet flow, or an uplink flow.

As described above, the distributed antenna system according to various embodiments may be synchronized with high accuracy using TSN and may provide various services.

Furthermore, the present disclosure provides optimized uplink summation in the distributed antenna system using an Ethernet frame, TSN, thereby efficiently utilizing a bandwidth and minimizing latency. Accordingly, the present disclosure may provide a distributed antenna system capable of effectively coping with temporal and spatial traffic fluctuations.

The present disclosure may provide a distributed antenna system using Time-Sensitive Networking (TSN) and a method of operating the distributed antenna system.

Furthermore, the present disclosure may provide an uplink summation device optimized in the distributed antenna system using TSN and a method thereof.

Furthermore, the present disclosure may provide a distributed antenna system capable of effectively coping with temporal and spatial traffic fluctuations.

Furthermore, the present disclosure may provide a distributed antenna system synchronized with high accuracy and may provide various services.

Furthermore, the present disclosure may sum uplink packets using an Ethernet frame to efficiently utilize a bandwidth and minimize latency.

Hereinabove, the disclosure has been described with reference to the preferred embodiments. However, it will be appreciated by those skilled in the art that various modifications and changes of the disclosure can be made without departing from the scope of the disclosure which are defined in the appended claims and their equivalents.

What is claimed is:

1. A method of processing uplink Ethernet packets of an aggregation node included in a distributed antenna system, the method comprising:
    receiving a plurality of uplink Ethernet packets,
    determining, in a delivery tree of multiple levels of the distributed antenna system, whether to sum the plurality of uplink Ethernet packets by considering a level at which the aggregation node is located;
    summing the plurality of received uplink Ethernet packets based on a result of the determining; and
    transmitting the summed uplink Ethernet packets in an uplink direction.

2. The method of claim 1, further comprising:
    determining whether to sum the plurality of received uplink Ethernet packets based on at least one of a latency and a bandwidth related to a transmission of the plurality of received uplink Ethernet packets,
    wherein the summing of the plurality of received uplink Ethernet packets comprises:
    summing the plurality of received uplink Ethernet packets based on a result of the determining.

3. The method of claim 2, wherein the determining of whether to sum the plurality of received uplink Ethernet packets comprises:
    determining whether to sum at least some of the plurality of received uplink Ethernet packets based on information about at least one of summation latency occurring according to summation, of at least some of the plurality of received uplink Ethernet packets, cut through latency occurring according to the transmission of the plurality of uplink Ethernet packets, and a bandwidth change due to summation of at least some of the plurality of received uplink Ethernet packets.

4. The method of claim 1, further comprising:
    receiving a control signal for whether to sum the plurality of received uplink Ethernet packets and a summation operation,
    wherein the summing of the plurality of received the uplink Ethernet packets comprises:
    summing the plurality of received uplink Ethernet packets according to the received control signal.

5. The method of claim 1, wherein the summing of the plurality of received uplink Ethernet packets comprises:
    assigning weights to the plurality of uplink Ethernet packets; and
    summing the plurality of uplink Ethernet packets comprising the assigned weights.

6. The method of claim 1, wherein the transmitting of the summed uplink Ethernet packets in an uplink direction comprises:
    allocating a flow for the summed uplink Ethernet packets; and
    transmitting the summed uplink Ethernet packets to the allocated flow.

7. The method of claim 1, wherein the summing of the plurality of received uplink Ethernet packets comprises:
    summing only some of the plurality of received uplink Ethernet packets, and
    the transmitting of the summed uplink Ethernet packets in an uplink direction comprises:
    transmitting the summed uplink Ethernet packets obtained by summing only some of the plurality of received uplink Ethernet packets and the remaining uplink Ethernet packets not summed among the plurality of received uplink Ethernet packets in an uplink direction.

8. The method of claim 1, wherein the summing of the plurality of received uplink Ethernet packets comprises:
    analyzing a header of each of the plurality of received uplink Ethernet packets;
    extracting a flow of each of the plurality of uplink Ethernet packets based on the analyzed header;
    scheduling the extracted flows, and
    summing the plurality of Ethernet packets based on the scheduling.

9. A sub system of a distributed antenna system, the sub system comprises:
    an uplink summation processor that receives and sums a plurality of uplink Ethernet packets; and
    a switch that transmits, the summed uplink Ethernet packets in an uplink direction,
    wherein the uplink summation processor is configured to;
    determine in a delivery tree of multiple levels of the distributed antenna system, whether to sum the plurality of received uplink Ethernet packets considering a level at which the switch receiving the plurality of uplink Ethernet packets.

10. The sub system of claim 9, wherein the uplink summation processor is configured to:
    determine whether to sum the plurality of received uplink Ethernet packets based on at least one of a latency and a bandwidth related to a transmission of the plurality of received uplink Ethernet packets; and
    sum the plurality of received uplink Ethernet packets based on a result of the determining.

11. The sub system of claim 10, wherein the uplink summation processor is configured to:
    determine whether to sum at least some of the plurality of received uplink Ethernet packets based on information about at least one of summation latency occurring according to summation of at least some of the plurality of received uplink Ethernet packets, cut through latency occurring according to the transmission of the plurality of uplink Ethernet packets, and a bandwidth change due to summation of at least some of the plurality of received uplink Ethernet packets.

12. The sub system of claim 9, wherein the uplink summation processor is configured to:
    receive a control signal for whether to sum the plurality of received uplink Ethernet packets and a summation operation, and
    sum the plurality of received uplink Ethernet packets according to the received control signal.

13. The sub system of claim 9, further comprising:
    a network controller,
    wherein the network controller is configured to:
    determine whether to sum the plurality of received uplink Ethernet packets of the uplink summation processor based on at least one of latency and a bandwidth related to transmission of the plurality of received uplink Ethernet packets; and
    control the uplink summation processor according to a result of the determining.

14. The sub system of claim 13, wherein the network controller is configured to:
    allocate a flow of each of the plurality of uplink Ethernet packets; and
    control the switch to transmit the plurality of uplink Ethernet packets to the allocated flows, respectively.

15. The sub system of claim 9, wherein the uplink summation processor is configured to:
   assign weights to the plurality of uplink Ethernet packets; and
   sum the plurality of uplink Ethernet packets comprising the assigned weights.

16. The sub system of claim 9, wherein the switch is configured to:
   receive an allocated flow for the summed uplink Ethernet packets from a network controller; and
   transmit the summed uplink Ethernet packets to the allocated flow.

17. The sub system of claim 9, wherein the uplink summation processor is configured to sum only some of the plurality of received uplink Ethernet packets, and
   the switch is configured to transmit the summed uplink Ethernet packets obtained by summing only some of the plurality of received uplink Ethernet packets and the remaining uplink Ethernet packets not summed among the plurality of received uplink Ethernet packets in an uplink direction.

18. The sub system of claim 9, wherein the uplink summation processor is configured to:
   analyze a header of each of the plurality of received uplink Ethernet packets;
   extract a flow of each of the plurality of uplink Ethernet packets based on the analyzed header;
   schedule the extracted flows, and
   sum the plurality of Ethernet packets based on the scheduling.

* * * * *